(12) United States Patent
Zedda et al.

(10) Patent No.: US 6,864,325 B2
(45) Date of Patent: Mar. 8, 2005

(54) ROMP WITH OLIGOMERIC UV-ABSORBERS

(75) Inventors: Alessandro Zedda, Basel (CH); Dario Lazzari, Bologna (IT); Massimiliano Sala, Modena (IT); Michela Bonora, Bologna (IT); Manuele Vitali, Bologna (IT); Paul Adriaan Van Der Schaaf, Allschwil (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 53 days.

(21) Appl. No.: 10/204,376

(22) PCT Filed: Feb. 13, 2001

(86) PCT No.: PCT/EP01/01558

§ 371 (c)(1),
(2), (4) Date: Nov. 29, 2002

(87) PCT Pub. No.: WO01/62821

PCT Pub. Date: Aug. 30, 2001

(65) Prior Publication Data

US 2003/0191242 A1 Oct. 9, 2003

(30) Foreign Application Priority Data

Feb. 22, 2000 (EP) ............................................ 00810148

(51) Int. Cl.[7] ........................ C08F 116/10; C08F 16/22; C08F 132/08

(52) U.S. Cl. .................... 525/332.1; 526/171; 526/190; 526/280; 526/308

(58) Field of Search ....................... 525/332.1; 521/171, 521/190, 280, 308

(56) References Cited

U.S. PATENT DOCUMENTS 6,525,125 B1 * 2/2003 Giardello et al. ........... 524/439

FOREIGN PATENT DOCUMENTS

| DE | 19718288 | 11/1997 |
|---|---|---|
| WO | 97/33198 | 9/1997 |
| WO | 99/50330 | 10/1999 |

* cited by examiner

*Primary Examiner*—James J. Seidleck
*Assistant Examiner*—Olga Asinovsky
(74) *Attorney, Agent, or Firm*—Tyler A. Stevenson

(57) ABSTRACT

The invention relates to metathesis polymers wherein an aromatic group that has UV-light absorbing properties is attached with a bridge group to the polymer. Also disclosed is a polymerizable composition comprising a catalytically effective amount of a penta- or hexavalent ruthenium or osmium carbene catalyst, the process for preparing the metathesis polymer by applying the reaction conditions of Ring Opening Metathesis Polymerization (=ROMP) to the polymerizable composition; and various technical applications of the metathesis polymers.

21 Claims, No Drawings

ROMP WITH OLIGOMERIC UV-ABSORBERS

The invention relates to compounds wherein one or more groups having UV-light absorbing properties are attached with bridge groups to an oligomer moiety, to the use of these compounds as stabilisers against degradation by light, heat or oxidation, particularly as stabilisers of synthetic polymers.

The invention particularly relates to metathesis oligomers wherein an aromatic group that has UV-light absorbing properties is attached with a bridge group to the oligomer; a polymerisable composition comprising a catalytically effective amount of a penta- or hexavalent ruthenium or osmium carbene catalyst, the process for preparing the metathesis polymer by applying the reaction conditions of Ring Opening Metathesis Polymerisation (=ROMP) to the polymerisable composition; and various technical applications of the metathesis polymers.

Thermal ROMP of cycloolefins other than cyclohexene has acquired great importance. This method requires appropriate catalysts. Catalysts of particular interest for ROMP are so-called metal carbenes, for example ruthenium and osmium complexes, bearing the group =CR'R" (wherein one of R' and R" represents hydrogen and the other represents phenyl, alkyl or alkenyl or both represent alkyl or alkenyl) attached to the central metal atom [WO 93/20111; S.Kanaoka et al., *Macromolecules* 28:4707–4713 (1995); C.Fraser et al., *Polym. Prepr.* 36:237–238 (1995); P. Schwab et al., *Angew. Chem.* 107:2179–2181 (1995)]. WO 99/00396 discloses compositions of pentavalent and hexavalent ruthenium and osmium carbene complex catalysts in admixture with dicyclopentadiene or cycloolefins other than cyclohexene.

UV-absorbers are substances which absorb radiant energy in the wavelength of UV. Suitable UV-absorbers are 2-(2'-hydroxyphenyl)benzotriazoles, 2-hydroxybenzophenones, esters of substituted or unsubstituted benzoic acids or 2-(2-hydroxyphenyl)-1,3,5-triazines. Added to polymers they filter off the UV-components of the electromagnetic irradiation and decrease light sensitivity and consequent discoloration and degradation.

A particular useful application of UV-absorbers in polymers is their use in so-called greenhouse films. Some types of crops are degraded by the UV-components of solar radiation which must be filtered off to obtain high quality and productivity of the crops. Additionally, some microorganisms, e.g. Botrytis Cinerea, can proliferate under specific UV-irradiation. These pest are harmful for the cultivation of some varieties of roses [R. Reuven et al., *Development of photoselective PE films for control of foliar pathogens in greenhouse-grown crops*, Plasticulture No. 102, pg. 7 (1994); Y. Eheshel et al., *The use of UV absorbing plastic sheets to protect crops against insects and spread of virus diseases*, CIPA Congress 1997].

Another useful application of UV-absorbers in polymers is their use for rigid and flexible packaging. Some packaged goods are sensitive to UV-radiation that may induce deterioration of their characteristics. The addition of UV-absorbers to the polymer foil can prevent the decomposing effect of UV-radiation on the polymer. As an example, some fresh food (meat, cheese) is subjected to fast modifications of its organoleptic properties, e.g. colour, in the event that UV-radiation is not filtered off [M. Lennersten, *Light induced Lipid Oxidation and Color Changes in Foods*, Ph.D. Thesis, Department of Food Science, Chalmers Institute of Technology (1998)].

Therefore, it is desirable to protect the polymerisates, particularly coatings, against the action of light by reducing the intensity of ultraviolet radiation in polymerisates exposed to visible light. It has surprisingly been found out that the efficiency of UV-absorbers added to oligomers obtained by ROMP is greatly enhanced in the event that the UV-absorber molecules are directly linked to the oligomer structure by chemical bonds such as ether or ester bonds.

Therefore the present invention relates to a compound of the formula:

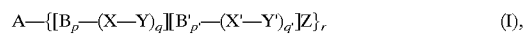

$$A\text{—}\{[B_p\text{—}(X\text{—}Y)_q][B'_{p'}\text{—}(X'\text{—}Y')_{q'}]Z\}_r \qquad (I),$$

wherein a) one of q and q' represents zero, one or a numeral greater than one and the other one represents one or a numeral greater than one;
   A and Z represent chain terminal groups from the chain transfer agent $A(\text{—}Z)_r$;
   r represents a numeral from one to four;
   B and B' independently of one another represent unsaturated or hydrogenated repeating units from cycloolefins polymerised by metathesis;
   X and X' represent identical or different bivalent groups;
   Y and Y' represent identical or different UV-light absorber moieties; and
   one of p and p' represents zero, one or a numeral greater than one and the other one represents one or a numeral greater than one; or wherein b) q and q' represent zero;
   A and Z represent chain terminal groups from the chain transfer agent $A(\text{—}Z)_r$, wherein
   A represents the chain terminal group Y"—X"—, wherein
   Y" represents a UV-light absorber moiety; and
   X" represents a bivalent group; and
   B, B', p, p' and r are as defined above.

The terms and definitions used in the description of the present invention preferably have the following meanings:

The formula I comprises any polymeric compound wherein the lowest total number of repeating units B and B' is two. The formula I comprises polymeric compounds of low molecular weight, such as oligomers or cooligomers, or homopolymers and copolymers of higher molecular weight, for example block, multi-block or gradient copolymers as well as copolymers characterised by a random, hyperbranched, star-shaped or dendritic arrangement of the polymer units as well as graft copolymers.

According to the embodiment a) one of q and q' represents zero, one or a numeral greater than one and the other one represents one or a numeral greater than one. At least one UV-light absorber moiety —Y or —Y' is attached with the bivalent bridge group —X— or —X'— to one or both groups B and B'. An additional UV-light absorber moiety may be present in one of the chain terminal groups —A and —Z.

The indices q and q' define the number of groups —X—Y and —X'—Y' attached to the monomer units B and B'. The fragments —X— and —X'— in the groups —X—Y and —X'—Y' are identical or different. Y and Y' represent identical or different UV-light absorber moieties. In the event that one of q and q' represents zero, at least one group —X—Y or —X'—Y' is attached to one of the monomer units B or B'. In the event that one of q and q' represents one, at least one additional group —X—Y or —X'—Y' is attached to the monomer units B or B'. Both indices q and q' may also represent numerals greater than one. In that event identical or different groups —X—Y and —X'—Y' are attached to the monomer units B and B'.

According to the embodiment b) both q and q' represents zero. In that event there are no groups —X—Y or —X'—Y' attached to the monomer units B and B'. One of A and Z then represents a chain terminal group Y"—X"—, wherein the UV-light absorber moiety Y" is present and wherein —X"— represents a bivalent group.

The compounds (I) are obtainable by metathesis polymerisation, as opposed to other methods of polymerisation, such as ionic or free radical polymerisation. Metathesis polymerisation is characterised by the ring-opening polymerisation of cycloalkenes initiated by olefin metathesis catalysts, cf. *Concise Encyclopedia of Polymer Science and Engineering*, J. I. Kroschwitz (editor), J. Wiley & Sons USA, 1990 Edition, ISBN 0-471-51253-2, pg. 611. Representative cycloalkenes polymerisable by this method include dicyclopentadiene, norbornadiene, norbornene, cyclooctene and cyclooctadiene.

According to both embodiments a) and b) the polymerisation by metathesis is performed in the presence of the of chain transfer agents (CTA) of the formula A(—Z)$_r$ wherein A and Z represent chain terminal groups and r represents a numeral from one to four. Chain transfer agents are used to regulate and limit the molecular weight in a polymer reaction, cf. F. W. Billmeyer, *Polymer Science, ISBN* 0-471-03196-8, pg. 63.

According to the embodiment a) suitable chain transfer agents are open chain alkenes (r=1), e.g. n-butene, n-hexene or n-octene, which are present in the compound (I) as identical or different terminal alkyl groups A and Z. In a particularly preferred embodiment A and Z are different. One of A and Z represents methyl and the other one represents linear $C_3$–$C_7$alkyl, e.g. n-propyl, n-pentyl or n-heptyl.

An alternative chain transfer agent may have a branched structure wherein two (r=2), three (r=3) or four (r=4) alkene groups are present in separate branches. These chain transfer agents are present in the compound (I) as bi-, tri- or tetrafunctional terminal groups A and two, three or four terminal alkyl groups Z. One additional UV-light absorber moiety may be present in one of the chain terminal groups —A and —Z.

According to the embodiment b) no groups —X—Y or —X'—Y' are attached to the monomer units B and B'. In that event the UV-light absorber moiety is present in one of the chain terminal groups —A and —Z. According to a preferred embodiment the chain transfer agent has a branched structure wherein three (r=3) alkene groups are present in separate branches of the UV-light absorber moiety. This chain transfer agent is present in the compound (I) as trifunctional group A wherein A is a UV-light absorber moiety. Z then represents methyl or linear $C_3$–$C_7$alkyl (star shaped polymers).

In a compound (I) the indices p and p' define the number of monomer repeating units B and B' present in the compound (I) according to the embodiments a) and b) of the invention. One of p and p' represents zero, one or a numeral greater than one and the other one represents one or a numeral greater than one.

In the event that one of the indices p and p' represents zero, the other one of p and p' represent one or a numeral greater than one. In the event that one of the indices p and p' represents one, the lowest value of p and p' is two, which defines an oligomer wherein the number of repeating units B and B' is two and wherein B and B' are identical or different. According to another embodiment of the invention one of the indices p and p' represents one and the other one of p and p' represents a numeral greater than one. In this case the lowest value of p and p' is three, which defines an oligomer wherein the number of repeating units B and B' is three. B and B' can be identical or different and define homo- and copolymers.

According to a preferred embodiment of the invention, p and p' together represent numerals from 2 to 1000. The preferred molecular weight range is from about 600 to 100 000, particularly from about 800 to 50 000. A highly preferred range is from about 1000 to 5000.

A preferred embodiment of the invention relates to compound (I), wherein p and p' together represent a numeral from 2 to 20.

The term cycloolefin polymerised or polymerisable by metathesis includes monocyclic cycloolefins other than cyclohexene and polycyclic, polycyclic condensed (fused) or bridged or polycyclic condensed (fused) and bridged cycloolefins. The individual rings in these cycloolefins consist of 3 to 16, especially 3 to 12, and preferably 3 to 8 ring members and may contain heteroatoms selected from the group consisting of O, S, N and Si and additional substituents selected from the group consisting of $C_1$–$C_4$alkyl, e. g. methyl or ethyl, $C_1$–$C_4$alkoxy, e. g. methoxy or ethoxy, halogen, e.g. chloro or bromo, cyano and trifluoromethyl.

A preferred group includes cycloolefins polymerised by metathesis selected from the group consisting of cyclopropene, cyclobutene, cyclopentene, cycloheptene, cyclooctene, cyclopentadiene, dicyclopentadiene, cyclohexadiene, cycloheptadiene, cyclooctadiene, norbornadiene, norbornene and norbornene derivatives.

A particularly preferred group of cycloolefins includes monocyclic cycloolefins having one double bond such as cyclobutene or cyclooctene and bicyclic cycloolefins having two double bonds such as 1,5-cyclooctadiene.

Another preferred group of cycloolefins includes bi-, tri-, tetra- and pentacyclic bridged cycloolefins obtainable by a Diels-Alder type addition reaction of dienes with so-called dienophiles. The individual rings in these bridged cycloolefinic adducts may be condensed with monocyclic or bicyclic carbocyclic aromatic groups, such as benzene or naphthalene, or with monocyclic or bicyclic heterocyclic aromatic groups such as thiophene, furane, pyridine or quinoline.

This preferred group of cycloolefins includes carbocyclic bi-, tri-, tetra- and pentacyclic bridged cycloolefins obtainable by a Diels-Alder type addition reaction, especially cycloolefins by Diels-Alder reaction of cyclopentadiene with suitable dienophiles.

A highly preferred group of cycloolefins of this type includes monomers based on norbornene and norbornadiene selected from the group consisting of norbornene-2,5-methoxycarbonyl-norbornene-2,5-methyl-5-methoxycarbonyl-norbornene-2,5-cyanonorbornene-2,5-methyl-5-cyanonorbornene, 5,5-dicyano-norbornene-2,1,4,5,8-dimethano-1,4,4a,5,6,7,8,8a-octa-hydronapthaline, 6-methyl-1,4,5,8-dimethano-1,4,4a,5,6,7,8,8a-octahydronapthaline, 6-methyl-6-methoxycarbonyl-1,4,5,8-dimethano1,4,4a,5,6,7,8,8a-octahydronapthaline, 6-methoxycarbonyl-1,4,5,8-dimethano-1,4,4a,5,6,7,8,8a-octahydronapthaline, 6-cyano-1,4,5,8-dimethano-1,4,4a,5,6, 7,8,8aoctahydronapthaline, 6-ethyl-1,4,5,8-dimethano-1,4, 4a,5,6,7,8,8a-octahydronapthaline, 6-ethylidene-1,4,5,8-dimethano-1,4,4a,5,6,7,8,8a-octahydronapthaline, 6,7-dimethyl1,4,5,8-dimethano-1,4,4a,5,6,7,8,8a-octahydronapthaline, 1,4-dimethano-1,4,4a, 9atetrahydrofluorene dicyclopentadiene, tricyclopentadiene, tetracyclopentadiene, tetracyclododecene and methyl tetracyclododecene.

Cycloolefins to which a UV-light absorber molecules moiety is attached are known or, if they are novel, are prepared in manner which is in itself known, e. g. by etherifying one hydroxy group of the UV-light absorber molecule with an open chain alkene or a reactive derivative thereof, e.g. allyl chloride or bromide, or by esterifying an alkenecarboxylic acid with the hydroxy group, thus generating a dienophile which is then reacted with a diene compound in a conventional Diels-Alder reaction.

The bivalent groups X, X' and X''' are bivalent atoms or groups selected from the group consisting of —O—, —S—, —NH—, —N($C_1$-$C_4$alkyl)$_2$-, —NH($C_1$-$C_4$alkyl)$_2$-, —C(=O)—O—, —O—(O=)C—, —NH—(O=)C—, —C(=O)—NH—, —N($C_1$-$C_4$alkyl)-(O=)C—, —C(=O)—N($C_1$-$C_4$alkyl)-, —O—C(=O)—O—, —NH—C(=O)—O—, —O—C(=O)—NH—, —O—C(=O)—N($C_1$-$C_4$alkyl)-, —O($C_1$-$C_8$alkylene)- and $C_1$-$C_8$alkylene.

In a preferred embodiment of the invention X, X' and X'' independently of one another represent bivalent groups selected from the group consisting of —O—, —O—C(=O)—, —C(=O)—O—, —O($C_1$-$C_8$alkylene)- and $C_1$-$C_8$alkylene.

Suitable bivalent groups X, X' and X''' may also consist of two of the groups of above connected with ethylene or straight chain or branched $C_3$-$C_{10}$-alkylene radicals, such as —O—$C_2H_4$—O—, —NH—$C_2H_4$—NH—, —NCH$_3$—$C_2H_4$—NCH$_3$— or any other chelate forming bivalent group known in complex chemistry.

The bivalent groups X, X' and X''' are attached to each monomer unit B and B' or, in the alternative, are attached only to some monomer units present in the polymer chain.

The term UV-light absorber moiety comprises any structural moiety effective as photostable UV-filter which is derived from UV-light absorber compounds present in cosmetic and pharmaceutical preparations for protecting the human epidermis or human hair from UV-radiation, particularly in the range from 290 to 400 nm. Examples of suitable UV-light absorber moieties are described in U.S. Pat. No. 6,132,703. A preferred UV-light absorber moiety is a substituent selected from the group consisting of 2-(2'-hydroxyphenyl)benzotriazoles, 2-hydroxybenzophenones, benzoic acid esters, oxanilides and 2-(2-hydroxyphenyl)-1, 3,5-triazines.

Specific 2-(2'-hydroxyphenyl)benzotriazoles are 2-(2'-hydroxy-5'-methylphenyl)-benzotriazole, 2-(2',4'-dihydroxyphenyl)-benzotriazole, 2-[3'-tert-butyl-2'-hydroxy-5-(1-hydroxycarbonyl-2-ethyl)-phenyl]-benzotriazole, 2-[3'-tert-butyl-2'-hydroxy-5-(1-hydroxycarbonyl-2-ethyl)-phenyl]-5-chlorobenzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)-phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)-benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazol-2-ylphenol]; the transesterification product of 2-[3'-tert-butyl-5'-(2-methoxy-carbonylethyl)-2'-hydroxyphenyl]-benzotriazole with polyethylene glycol 300; [R—$CH_2CH_2$—COO—$CH_2CH_2$—]$_2$; wherein R represents 3'-tert-butyl-4'-hydroxy-5'-2H-benzotriazol-2-yl-phenyl; 2-[2'-hydroxy-3'-(α,α-di-methylbenzyl)-5'-(1,1,3,3-tetramethylbutyl)phenyl]benzotriazole and 2-[2'-hydroxy-3'-(1,1,3,3-tetramethylbutyl)-5'-(α,α-dimethylbenzyl)phenyl]benzotriazole.

Specific 2-hydroxybenzophenones are, for example, the 4-hydroxy, 4-methoxy, 4-octyloxy, 4-decyloxy, 4-dodecyloxy, 4-benzyloxy, 2,4-dihydroxy, 4,2',4'-trihydroxy and 2'-hydroxy-4,4'-dimethoxy derivatives.

Specific benzoic acid esters are, for example, 4-tert-butylphenyl salicylate, phenyl salicylate, octylphenyl salicylate, dibenzoylresorcinol, bis(4-tert-butylbenzoyl)resorcinol, benzylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl3,5-di-tert-butyl-4-hydroxybenzoate.

Specific oxanilides are, for example, 2-ethyl-2'-hydroxyoxanilide, 4,4'-dioctyloxyoxanilide, 2,2'-diethoxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of o- and p-methoxy- and of o- and p-ethoxy-disubstituted oxanilides.

Specific 2-(2-hydroxyphenyl)-1,3,5-triazines are, for example, 2,4-bis(biphenyl-4-yl)-6-(2,6-dihydroxy)-1,3,5-triazine, 2-(2,4-dihydroxyphenyl)-4,6-diphenyl1,3,5-triazine, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4, 6-bis(2,4-dimethylphenyl)-1,3,5-triazine, 2,4-bis(2-hydroxy-4-propyloxyphenyl)-6-(2,4-dimethylphenyl)-1,3, 5-triazine, 2-(2-hydroxy-4-octyloxyphenyl)-4,6bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)-phenyl]-4,6-bis(2,4-dimethylphenyl)-1,3,5-triazine, 2-[2-hydroxy-4-(2-hydroxy-3-octyloxypropyloxy)-phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4[3-(2-ethylhexyl-1-oxy)-2-hydroxypropyloxy]phenyl}-4,6-bis(2,4-dimethylphenyl)-1,3,5-triazine.

Particularly preferred are UV-light absorbers selected from the group consisting of (2,4di-hydroxyphenyl)-phenylmethanone, 2-benzotriazol-2-yl-4methylphenol, 4-benzotriazol-2-ylbenzene-1,3-diol, 3-[3-tert.-butyl-5-(5-chlorobenzotriazol-2-yl)-4hydroxyphenyl]-propionic acid, 3-[5-(benzotriazol-2-yl)-3-tert.-butyl-4-hydroxyphenyl] propionic acid; 4-(4,6-diphenyl)-1,3,5-triazin-2-yl-benzene1,3-diol, 4-[4,6-bis(biphenyl-4-yl)-1,3,5-triazin-2-yl]-benzene-1,3-diol, 4-[4,6-di-(2,4-di-hydroxyphenyl)-1,3,5-triazin2-yl]-benzene-1,3-diol and N'-2-ethylphenyl-N'-2-hydroxyphenyloxalamide.

A preferred embodiment of the invention relates to a compound (I), wherein
- a) A and Z represent chain terminal groups from a mono-(r=1), di-(r=2) or trifunctional (r=3) chain transfer agent $A(-Z)_r$;
  r represents a numeral from one to three;
  B and B' independently of one another represent an unsaturated or hydrogenated repeating unit from cycloolefins polymerised by metathesis selected from the group consisting of cyclopropene, cyclobutene, cyclopentene, cycloheptene, cyclooctene, cyclopentadiene, dicyclopentadiene, cyclohexadiene, cycloheptadiene, cyclooctadiene, norbornadiene, norbornene and norbornene derivatives; and
  X, X', Y, Y', p, p', q and q' are as defined above; or wherein
- b) q and q' represent zero;
  A and Z represent chain terminal groups from a mono-(r=1), di- (r=2) or trifunctional (r=3) chain transfer agent $A(-Z)_r$; wherein
  A represents the chain terminal group Y"—X"—, wherein
  Y" represents a UV-light absorber moiety; and
  X" represents a bivalent group; and
  B, B', p, p' and r are as defined above under a).

Another preferred embodiment of the invention relates to a compound (I), wherein
- a) one of q and q' represents zero, one or a numeral greater than one and the other one represents a numeral greater than one;
  A and Z represent chain terminal groups from a mono-(r=1), di- (r=2) or trifunctional (r=3) chain transfer agent $A(-Z)_r$;
  r represents a numeral from one to three;
  B and B' independently of one another represent an unsaturated or hydrogenated repeating unit from cycloolefins polymerised by metathesis selected from the group consisting of cyclopropene, cyclobutene, cyclopentene, cycloheptene, cyclooctene, cyclopentadiene, dicyclopentadiene, cyclohexadiene, cycloheptadiene, cyclooctadiene, norbornadiene, norbornene and norbornene derivatives;
  X and X' independently of one another represent bivalent groups selected from the group consisting of —O—, —O—C(=O)—, —C(=O)—O—, —O($C_1$–$C_8$alkylene)- and $C_1$–$C_8$alkylene;
  Y and Y' independently of one another represent a UV-light absorber moiety selected from the group consisting of 2-(2'-hydroxyphenyl)benzotriazoles, 2-hydroxybenzophenones, benzoic acid esters, oxanilides and 2-(2-hydroxyphenyl)-1,3,5-triazines; and
  p and p' are as defined above; or wherein
- b) q and q' represent zero;
  A represents the chain terminal group Y"—X"—, wherein
  Y" represents a UV-light absorber moiety selected from the group consisting of 2-(2'-hydroxyphenyl)benzotriazoles, 2-hydroxybenzophenones, benzoic acid esters, oxanilides and 2-(2-hydroxyphenyl)-1,3,5-triazines; and
  X" represents a bivalent group selected from the group consisting of —O—, —O—C(=O)—, —C(=O)—O—, —O($C_1$–$C_8$alkylene)- and $C_1$–$C_8$alkylene; and
  B, B', p, p' and r are as defined above.

A highly preferred embodiment of the invention relates to a compound (I), wherein
- a) one of q and q' represents zero or a numeral greater than one and the other one represents a numeral greater than one;
  A and Z represent chain terminal groups from a mono- (r=1), di- (r=2) or trifunctional (r=3) chain transfer agent $A(-Z)_r$;
  r represents a numeral from one to three;
  B and B' independently of one another represent an unsaturated or hydrogenated repeating unit from cycloolefins polymerised by metathesis selected from the group consisting of cyclopentadiene, dicyclopentadiene, norbornadiene, norbornene and norbornene derivatives;
  X and X' independently of one another represent bivalent groups selected from the group consisting of —O—, —O—C(=O)—, —C(=O)—O—, —O($C_1$–$C_8$alkylene)- and $C_1$–$C_8$alkylene;
  Y and Y' independently of one another represent a UV-light absorber moiety selected from the group consisting of (2,4-dihydroxyphenyl)-phenylmethanone, 2-benzotriazol-2-yl-4-methylphenol, 4-benzotriazol-2-ylbenzene-1,3-diol, 3-[3-tert.-butyl-5-(5-chlorobenzotriazol-2-yl)-4-hydroxyphenyl]-propionic acid, 3-[5-(benzotriazol-2-yl)-3-tert.-butyl-4-hydroxyphenyl]-propionic acid, 4-(4,6-diphenyl)-1,3,5-triazin-2-yl-benzene-1,3-diol, 4-[4,6-bis(biphenyl-4-yl)-1,3,5-triazin-2-yl]-benzene-1,3-diol, 4-[4,6-di-(2,4-dihydroxyphenyl)-1,3,5-triazin-2-yl]-benzene-1,3-diol, N'-2-ethylphenyl-N'-2-hydroxyphenyloxalamide; and
  p and p' are as defined above; or wherein
- b) q and q' represent zero;
  A represents the chain terminal group Y"—X"—, wherein
  Y" represents a UV-light absorber moiety selected from the group consisting of (2,4-dihydroxyphenyl)-phenylmethanone, 2-benzotriazol-2-yl-4-methylphenol, 4-benzotriazol-2-ylbenzene-1,3-diol, 3-[3-tert.-butyl-5-(5-chlorobenzotriazol-2-yl)-4-hydroxyphenyl]-propionic acid, 3-[5-(benzotriazol-2-yl)-3-tert.-butyl-4-hydroxyphenyl]-propionic acid, 4-(4,6-diphenyl)-1,3,5-triazin-2-yl-benzene-1,3-diol, 4-[4,6-bis(biphenyl-4-yl)-1,3,5-triazin-2-yl]-benzene-1,3-diol, 4-[4,6-di-(2,4-dihydroxyphenyl)-1,3,5-triazin-2-yl]-benzene-1,3-diol, N'-2-ethylphenyl-N'-2-hydroxyphenyloxalamide; and
  X" represents a bivalent group selected from the group consisting of —O—, —O—C(=O)—, —C(=O)—O—, —O($C_1$–$C_8$alkylene)- and $C_1$–$C_8$alkylene; and
  B, B', p, p' and r are as defined above.

Another highly preferred embodiment relates to a compound of the formula

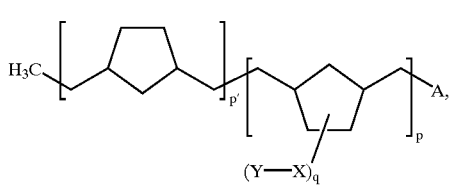

(IA)

wherein q represents one;

p and p' together represent a numeral from 2 to 20;

A represents a chain terminal group from an olefinic chain transfer agent (CTA);

X represents a bivalent group selected from the group consisting of —O—, —O—C(=O)—, —C(=O)—O—, —O(C$_1$-C$_8$alkylene)- and C$_1$-C$_8$alkylene; and Y represents a UV-light absorber moiety selected from the group consisting of 2-(2'-hydroxyphenyl) benzotriazoles, 2-hydroxybenzophenones, benzoic acid esters, oxanilides and 2-(2-hydroxyphenyl)-1,3,5-triazines; or wherein q represents zero;

p and p' together represent a numeral from 2 to 20; and

A represents the group Y—X—, wherein

X represents a bivalent group selected from the group consisting of —O—, —O—C(=O)—, —C(=O)—O—, —O(C$_1$-C$_8$alkylene)- and C$_1$-C$_8$alkylene; and Y represents a UV-light absorber moiety selected from the group consisting of 2-(2'-hydroxyphenyl) benzotriazoles, 2-hydroxybenzophenones, benzoic acid esters, oxanilides and 2-(2-hydroxyphenyl)-1,3,5-triazines.

A particularly highly preferred embodiment of the invention relates to a compound of the formula:

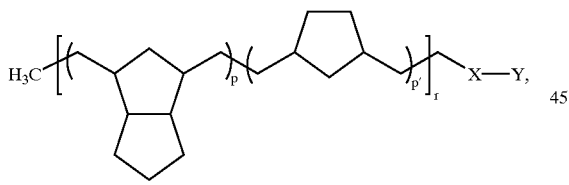

(IB)

wherein r represents a numeral from one to three;

p and p' together represent a numeral from 2 to 20;

X represents a bivalent group selected from the group consisting of —O—, —O—C(=O)—, —C(=O)—O—, —O(C$_1$-C$_8$alkylene)- and C$_1$-C$_8$alkylene; and Y represents a substituted phenolic group derived from UV-light absorbers selected from the group consisting of (2,4-dihydroxyphenyl)-phenylmethanone, 2-benzotriazol-2-yl-4-methylphenol, 4-benzotriazol-2-ylbenzene-1,3-diol, 3-[3-tert.-butyl-5-(5-chlorobenzotriazol-2-yl)-4-hydroxyphenyl]-propionic acid, 3-[5-(benzotriazol-2-yl)-3-tert.-butyl-4-hydroxyphenyl]-propionic acid; 4-(4,6-diphenyl)1,3,5-triazin-2-yl-benzene-1,3-diol, 4-[4,6-bis(biphenyl-4-yl)-1,3,5-triazin2-yl]-benzene-1,3-diol, 4-[4,6-di-(2,4-di-hydroxyphenyl)-1,3,5-triazin2-yl]-benzene-1,3-diol, 4-[4,6-bis(4-hydroxyphenyl)-1,3,5-triazin-2-yl]-benzene-1,3-diol and N'-2-ethylphenyl-N'-2-hydroxyphenyloxalamide;

Another embodiment of the invention relates to a metathesis polymer of the formula

(I'), wherein

A and A' represent chain terminal groups from a chain transfer agent (CTA);

B represents an unsaturated or hydrogenated repeating unit from cycloolefins polymerised by metathesis;

X represents a bridge group which connects B with the substituent Y;

Y represents the aromatic substituent of a UV-light absorber;

p represents a numeral greater than one and defines the number of repeating units in the metathesis polymer; and q represents one or a numeral greater than one and defines the number of aromatic substituents Y attached with the bridge group X to B.

Another preferred embodiment of the invention relates to a polymerisate comprising a metathesis polymer (I'), wherein A and A' represent chain terminal groups from an olefinic chain transfer agent (CTA);

B represents an unsaturated or hydrogenated repeating unit from cycloolefins polymerised by metathesis selected from the group consisting of cyclopropene, cyclobutene, cyclopentene, cycloheptene, cyclooctene, cyclopentadiene, cyclohexadiene, cycloheptadiene, cyclooctadiene, norbornadiene, norbornene and norbornene derivatives;

X represents bivalent atoms or bridge groups selected from the group consisting of —O—, —O—C(=O)— and —C(=O)—O—;

Y represents a substituted phenolic group of UV-light absorbers selected from the group consisting of 2-(2'-hydroxyphenyl)benzotriazoles, 2-hydroxybenzophenones, benzoic acid esters, oxanilides and 2-(2-hydroxyphenyl)-1,3,5-triazines;

p represents a numeral greater than ten; and q represents one or a numeral greater than one.

Another particularly preferred embodiment of the invention relates to a polymerisate comprising a metathesis polymer (I'), wherein A and A' represent chain terminal groups from an olefinic chain transfer agent (CTA);

B represents an unsaturated or hydrogenated repeating unit from cycloolefins polymerised by metathesis selected from the group the group consisting of cyclopentadiene, norbornadiene, norbornene and norbornene derivatives;

X represents bivalent atoms or bridge groups selected from the group consisting of —O—, —O—C(=O)— and —C(=O)—O—;

Y represents a substituted phenolic group of UV-light absorbers selected from the group consisting of (2,4-dihydroxyphenyl)-phenylmethanone, 2-benzotriazol-2-yl-4-methyl-phenol, 4-benzotriazol-2-ylbenzene-1,3-diol, 3-[3-tert.-butyl-5-(5-chlorobenzotriazol-2-yl)-4-hydroxyphenyl]-propionic acid, 3-[5-(benzotriazol-2-yl)-3-tert.-butyl-4-hydroxyphenyl]-propionic acid, 4-(4,6-diphenyl)-1,3,5-triazin-2-yl-benzene-1,3-diol, 4-[4,6-bis(biphenyl-4-yl)-1,3,5-triazin-2-yl]-benzene-1,3-diol, 4-[4,6-di-(2,4-dihydroxyphenyl)-1,3,5-triazin-2-yl]-benzene-1,3-diol, N'-2-ethylphenyl-N'-2-hydroxyphenyloxalamide;

p represents a numeral greater than ten; and q represents one or a numeral greater than one.

A specifically preferred embodiment of the invention relates to a polymerisate comprising a metathesis polymer (I'), wherein A and A' represent chain terminal groups from an olefinic chain transfer agent (CTA);

B represents a polymer fragment comprising repeating units from cycloolefins polymerised by metathesis selected from the group consisting of norbornene-2,5-methoxy-carbonyl-norbornene-2,5-methyl-5-methoxycarbonyl-norbornene-2,5-cyanonorbornene-2,5-methyl-5-cyanonorbornene, 5,5-dicyano-norbornene2,1,4,5,8-dimethano-1,4,4a,5,6,7,8,8a-octahydronapthaline, 6-methyl-1,4,5,8-dimethano-1,4,4a,5,6,7,8,8a-octahydronapthaline, 6-methyl-6-methoxycarbonyl-1,4,5,8-dimethano-1,4,4a,5,6,7,8,8a-octahydronapthaline, 6-methoxycarbonyl-1,4,5,8-dimethano1,4,4a,5,6,7,8,8a-octahydronapthaline, 6-cyano-1,4,5,8-dimethano-1,4,4a,5,6,7,8,8a-octahydronapthaline, 6-ethyl-1,4,5,8-dimethano-1,4,4a,5,6,7,8,8a-octahydronapthaline, 6-ethylidene-1,4,5,8-dimethano-1,4,4a,5,6,7,8,8a-octahydronapthaline, 6,7-dimethyl-1,4,5,8-dimethano-1,4,4a,5,6,7,8,8a-octahydronapthaline, 1,4-dimethano-1,4,4a,9a-tetrahydrofluorene, dicyclopentadiene, tricyclopentadiene, tetracyclopentadiene, tetracyclododecene and methyl tetracyclododecene;

X represents bivalent atoms or bridge groups selected from the group consisting of —O—, —O—C(=O)— and —C(=O)—O—;

Y represents a substituted phenolic group of UV-light absorbers selected from the group consisting of (2,4-dihydroxyphenyl)-phenylmethanone, 2-benzotriazol-2-yl-4-methylphenol, 4-benzotriazol-2-ylbenzene-1,3-diol, 3-[3-tert.-butyl-5-(5-chlorobenzotriazol-2-yl)-4-hydroxyphenyl]-propionic acid, 3-[5-(benzotriazol-2-yl)-3-tert.-butyl-4-hydroxyphenyl]-propionic acid; 4-(4,6-diphenyl)-1,3,5-triazin-2-yl-benzene1,3-diol, 4-[4,6-bis(biphenyl-4-yl)-1,3,5-triazin-2-yl]-benzene-1,3-diol, 4-[4,6-di-(2,4-dihydroxyphenyl)-1,3,5-triazin-2-yl]-benzene-1,3-diol and N'-2-ethylphenyl-N'-2-hydroxyphenyloxalamide;

p represents a numeral greater than ten; and q represents one or a numeral greater than one.

High preference is also given to a polymerisate comprising a metathesis polymer having the formula $$A \underbrace{\phantom{XX}}_{n'} \underbrace{\phantom{XX}}_{n} A'(X'\!-\!Y)_r \quad \text{(I'')}$$

(with pendant $-O-Y$ group)

wherein

A and A' represent chain terminal groups from an olefinic chain transfer agent (CTA);

X represents a bridge group which connects A' with Y;

Y represents a substituted phenolic group of UV-light absorbers selected from the group consisting of 2-(2'-hydroxyphenyl)benzotriazoles, 2-hydroxybenzophenones, benzoic acid esters, oxanilides and 2-(2-hydroxyphenyl)-1,3,5-triazines;

r represents zero or one; and n and n' represent numerals greater than zero.

The present invention also relates to a polymerisable composition comprising a) a catalytically effective amount of a penta- or hexavalent ruthenium or osmium carbene catalyst capable of performing ring opening metathesis polymerisation of cycloolefins; and b) the chain transfer agent A(—Z)$_r$ and monomers capable of forming a compound of the formula $$A\!-\!\{[B_p\!-\!(X\!-\!Y)_q][B'_{p'}\!-\!(X'\!-\!Y')_{q'}]Z\}_r \qquad (I),$$

wherein A, B, B' X, X', Y, Y', Z, r, p, p', q and q' are as defined above.

A suitable penta- or hexavalent ruthenium or osmium carbene catalyst present in the composition mentioned above is described on pages 12–44 of *Olefin Metathesis and Metathesis Polymerization*; K. J. Ivin, *J. C. Mol. Academic Press*, ISBN 0-12-377045-9.

A particularly suitable penta- or hexavalent ruthenium or osmium carbene catalyst is represented by the formulae:

$$\begin{array}{c} L^1 \\ L_a\diagdown \big| \\ \phantom{L_a}Me\!=\!\!\!\underset{H}{C}\!-\!R \quad \text{or} \\ L_b\diagup \big| \\ L^2 \end{array} \qquad \text{(IIa)}$$

$$\begin{array}{c} L^1 \\ L_a\diagdown \big| \\ L_b\!-\!Me\!=\!\!\!\underset{H}{C}\!-\!R, \\ \diagup \big| \\ L^2 \;\; L^3 \end{array} \qquad \text{(IIb)}$$

wherein

Me represents ruthenium or osmium;

$L_a$ and $L_b$ independently of one another represent anionic ligands;

$L^1$, $L^2$ and $L^3$ independently of one another represent monodentate, donor ligands; and R represents aryl, arylthio, or $C_3$–$C_5$-alkenyl.

The anionic ligands $L_a$ and $L_b$ are, for example, hydride ions (H$^-$) or are derived from inorganic or organic acids, examples being halides, e.g. F$^-$, Cl$^-$, Br$^-$ or I$^-$, fluoro complexes of the type $BF_4^-$, $PF_6^-$, $SbF_6^-$ or $AsF_6^-$, anions of oxygen acids, alcoholates or acetylides or anions of cyclopentadiene.

The anions of oxygen acids can be, for example, sulphate, phosphate, perchlorate, perbromate, periodate, antimonate, arsenate, nitrate, carbonate, the anion of a $C_1$–$C_8$carboxylic acid, such as formate, acetate, propionate, butyrate, benzoate, phenylacetate, mono-, di- or tri-chloro- or -fluoroacetate, sulfonates, for example methylsulfonate, ethylsulfonate, propylsulfonate, butylsulfonate, trifluoromethylsulfonate (triflate), unsubstituted or $C_1$–$C_4$alkyl, $C_1$–$C_4$alkoxy or halogen, especially fluoro, chloro or bromo substituted phenylsulfonate or benzylsulfonate, for example tosylate, mesylate, brosylate, p-methoxy- or p-ethoxyphenylsulfonate, pentafluorophenylsulfonate or 2,4,6-triisopropylsulfonate.

Particularly preferred anionic ligands $L_a$ and $L_b$ are H⁻, F⁻, Cl⁻, Br⁻, $BF_4^-$, $PF_6^-$, $SbF_6^-$, $AsF_6^-$, $CF_3SO_3^-$, $C_6H_5$—$SO_3^-$, 4-methyl-$C_6H_4$—$SO_3^-$, 3,5-dimethyl-$C_6H_3$—$SO_3^-$, 2,4,6-trimethyl-$C_6H_2$—$SO_3^-$ and 4-$CF_3$—$C_6H_4$—$SO_3^-$ and also cyclopentadienyl (Cp⁻). Cl⁻ is especially preferred.

In the compounds of the formulae IIa and IIb up to three neutral ligands from the group $L^1$, $L^2$ and $L^3$ are tertiary-substituted phosphine having 3- about 40, preferably 3–30 and, with particular preference, 3–18 carbon atoms. The tertiary-substituted phosphine is preferably a compound of the formula

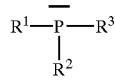

in which $R^1$, $R^2$ and $R^3$ independently of one another are $C_1$–$C_{20}$alkyl, $C_3$–$C_{12}$cycloalkyl, $C_2$–$C_{11}$heterocycloalkyl, $C_5$–$C_{12}$aryl, $C_1$–$C_{12}$heteroaryl or $C_6$–$C_{14}$aralkyl, where alkyl, cycloalkyl, heterocycloalkyl, aryl, heteroaryl and aralkyl are unsubstituted or substituted by one or more substituents of the group consisting of $C_1$–$C_6$alkyl, $C_1$–$C_6$alkoxy, $C_{1-C6}$haloalkyl, $C_5$–$C_{12}$aryl, —$NO_2$, $SO_3^-$, ammonium and halogen; the radicals $R^1$ and $R^2$ together are unsubstituted or $C_1$–$C_6$alkyl-, $C_1$–$C_6$haloalkyl-, —$NO_2$— or $C_1$–$C_6$alkoxy-substituted tetra- or pentamethylene, which may be fused to 1 or 2 1,2-phenylene radicals, and $R^3$ is as defined above.

Particular preference is given to phosphines wherein $R^1$, $R^2$ and $R^3$ are methyl, ethyl, n- or i-propyl, n-, i-, s- or t-butyl, 1-, 2- or 3-pentyl, 1-, 2-, 3- or 4-hexyl, cyclopentyl, cyclohexyl, phenyl, naphthyl or benzyl, e.g. (i-$C_3H_7$)$_3$P, ($C_5H_9$)$_3$P and ($C_6H_{11}$)$_3$P.

In the compounds of the formulae IIa and IIb one or two neutral ligands from the group $L^1$, $L^2$ and $L^3$ are monodentate, neutral e⁻ donor ligands having electron donor properties, or two ligands from this group together are bidentate, neutral e⁻ donor ligands.

Such ligands are derived from unsubstituted or substituted heteroarenes from the group consisting of furan, thiophene, pyrrole, pyridine, bis-pyridine, picolylimine, γ-pyran, γ-thiopyran, phenanthroline, pyrimidine, bis-pyrimidine, pyrazine, indole, coumarone, thionaphthene, carbazole, dibenzofuran, dibenzothiophene, pyrazole, imidazole, benzimidazole, oxazole, thiazole, bis-thiazole, isoxazole, isothiazole, quinoline, bis-quinoline, isoquinoline, bis-isoquinoline, acridine, chromene, phenazine, phenoxazine, phenothiazine, triazine, thian-threne, purine, bis-imidazole and bis-oxazole.

These ligands may further be substituted by suitable substituents selected from the group consisting of $C_1$–$C_6$-alkyl, $C_1$–$C_6$alkoxy, carboxy, $C_1$–$C_6$alkoxycarbonyl, $C_1$–$C_6$haloalkyl, nitro, sulfo, ammonium and halogen.

Aryl and arylthio R is, for example, unsubstituted phenyl and phenylthio or phenyl and phenylthio which is substituted by one or more substituents from the group consisting of $C_1$–$C_6$-alkyl, $C_1$–$C_6$alkoxy, carboxy, $C_1$–$C_6$alkoxycarbonyl, $C_1$–$C_6$haloalkyl, nitro, sulfo, ammonium and halogen.

$C_3$–$C_5$-alkenyl R is, for example, vinyl, 1-, 2- or 3-propenyl, or the different butenyl, pentenyl or hexenyl isomers, 1,3-hexadienyl or 2,4,6-heptatrienyl or is ethylidene, 1- or 2-propylidene or 1-, 2- or 3-propylidene directly attached to the carbene group. These substituents may be substituted with additional substituents selected from the group consisting of halogen, $C_1$–$C_5$-alkoxy or phenyl which in turn may be substituted with $C_1$–$C_5$-alkyl halogen or $C_1$–$C_5$-alkoxy.

The monomers and chain transfer agents can be present in an amount of from 0.01 to 99% by weight, preferably from 0.1 to 95% by weight, with particular preference from 1 to 90% by weight and, with especial preference, from 5 to 80% by weight, based on the monomers present in the composition.

The composition may comprise inert solvents. One particular advantage is that in the case of liquid monomers metathesis polymerisation can be carried out without the use of a solvent. A further advantage is that the polymerisation can even be carried out in water, polar and protic solvents or water/solvent mixtures.

Examples of suitable inert solvents are protic polar and aprotic solvents, which can be used alone or in mixtures of at least two solvents. Examples are ethers (dibutyl ether, tetrahydrofuran, dioxane, ethylene glycol monomethyl or dimethyl ether, ethylene glycol monoethyl or diethyl ether, diethylene glycol diethyl ether, triethylene glycol dimethyl ether), halogenated hydrocarbons, etc..

In the context of the present invention, catalytic amounts denote preferably an amount from 0.001 to 1.0 mol-%, with particular preference from 0.01 to 0.5 mol-% and, with very particular preference, from 0.01 to 0.1 mol-%, based on the amount of monomer.

The composition of the invention can comprise additives suitable for polymers, which additives are preferably used as formulating auxiliaries to improve together with the compounds of the formula (I) the chemical and physical properties of the polymers containing these additives. The auxiliaries can be present in high proportions, for example, in amounts of up to 70% by weight, preferably from 1 to 70% by weight, more preferably from 5 to 60% by weight, with particular preference from 10 to 50% by weight and with especial preference from 10 to 40% by weight, based on the composition. Such auxiliaries have been disclosed in large numbers and are set out by way of example in the following list of auxiliaries: antioxidants selected from the group consisting of alkylated monophenols, alkylthiomethylphenols, hydroquinones and alkylated hydroquinones, tocopherols, hydroxylated thiodiphenyl ethers, alkylidene-bis-phenols, O-, N- and S-benzyl compounds, hydroxybenzylated malonates, aromatic hydroxybenzyl compounds, triazine compounds, benzylphosphonates, acylaminophenols, esters of β-(3,5-di-tert.-butyl-4-hydroxyphenyl)propionic acid, esters of β-(3,5-di-tert.-butyl-4-hydroxy3-methylphenyl)propionic acid, esters of β-(3,5-dicyclohexyl-4-hydroxyphenyl)propionic acid, esters and amides of 3,5-di-tert.-butyl-4-hydroxyphenyl)-propionic acid, ascorbic acid and aminic antioxidants, light stabilisers, phosphites, phosphines, phosponites, hydroxylamines, nitrones, thiosynergists, peroxide scavengers, polyamide stabilisers, basic co-stabilisers, nucleating agents, fillers and reinforcing agents, plasticizers, lubricants, emulsifiers, pigments, rheological additives, levelling assistants, optical brighteners, flameproofing agents, antistatic agents, blowing agents, benzofuranones and indolinones.

Such auxiliaries have been disclosed in large numbers and are set out by way of example in the following list of auxiliaries:
1. Antioxidants
1.1. Alkylated monophenols, for example 2,6-di-tert-butyl-4-methylphenol, 2-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-di-methylphenol, 2,6-dioctadecyl-4-methylphenol, 2,4,6-tricyclohexylphenol, 2,6-di-tert-butyl-4-methoxymethylphenol, linear or side chain-branched nonylphenols; such as 2,6-dinonyl-4-methylphenol, 2,4-dimethyl-6-(1-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocopherols, for example α-, β-, γ- or δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulphide.

1.6. Alkylidene-bis-phenols, for example 2,2'-methylene-bis(6-tert-butyl-4-methylphenol), 2,2'-methylenebis(6-tert-butyl-4-ethylphenol), 2,2'-methylene-bis[4-methyl-6-(α-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl)-butane, 2,2-bis(3,5-di-tert-butyl-4-hydroxyphenyl) propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O—, N— and S-benzyl compounds, for example 3,5,3',5'-tetra-tert-butyl-4,4'-dihydroxy-dibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)-amine, bis(4-tert-butyl-3-hydroxy-2,6-dimethylbenzyl)dithioterephthalate, bis(3,5-di-tert-butyl-4-hydroxybenzyl)sulphide, isooctyl 3,5-di-tert-butyl-4-hydroxybenzylmercaptoacetate.

1.8. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl) malonate, didodecyl mercaptoethyl-2,2-bis(3,5-di-tert-butyl-4-hydroxybenzyl)malonate, di-[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

1.11. Benzylphosphonates, for example dimethyl 2,5-di-tert-butyl-4-hydroxybenzyl-phosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (2-hydroxyethyl)isocyanurate, N,N'-bis(2-hydroxyethyl) oxalamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (2-hydroxyethyl) isocyanurate, N,N'-bis(2-hydroxyethyl) oxalamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (2-hydroxyethyl)isocyanurate, N,N'-bis(2-hydroxyethyl)-oxalamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.16. Esters of 3,5-di-tert-butyl-4-hydroxyphenylacetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(2-hydroxyethyl) isocyanurate, N,N'-bis(2-hydroxyethyl)-oxalamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.17. Amides of β-(3,5-di-tert-butyl-4-hydroxyphenyl) propionic acid, e.g. N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]-oxamide (Naugard® XL-1 from Uniroyal).

1.18. Ascorbic acid (vitamin C).

1.19. Aminic antioxidants, for example N,N'-diisopropyl-p-phenylenediamine, N,N'-di-sec-butyl-p-phenylenediamine, N,N'-bis(1,4-dimethyl-pentyl)-p-phenylenediamine, N,N'-bis(1-ethyl-3-methyl-pentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di-(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)-diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, di-(4-methoxyphenyl)amine, 2,6-di-tert-butyl-4-dimethylaminomethylphenol, 2,4'-diamino-diphenylmethane, 4,4'-diaminodiphenylmethane, N,N,N',N'-tetramethyl-4,4'-diamino-diphenylmethane, 1,2-di[(2-methylphenyl)amino]ethane, 1,2-di(phenylamino)-propane, (o-tolyl)biguanide, di-[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, mixtures of mono- and dialkylated tert-butyldiphenylamines, 2,3-dihydro-3,3-dimethyl-4H-1,4-benzothiazine, phenothiazine, a mixture of mono- and dialkylated tert-butyl/tert-octyl-phenothiazines, a mixture of mono- and dialkylated tert-octyl-phenothiazines, N-allylphenothiazine, N,N,N',N'-tetraphenyl-1,4-diaminobut-2-ene, N,N-bis(2,2,6,6-tetramethylpiperidin-4-yl)hexamethyienediamine, bis(2,2,6,6-tetramethylpiperidin-4-yl)sebacate, 2,2,6,6-tetramethylpiperidin-4-one and 2,2,6,6-tetramethylpiperidin-4-ol.

2. Other UV-Absorbers and Light Stabilisers 2.1. Acrylates, for example ethyl α-cyano-β,β-diphenylacrylate or isooctyl α-cyano-β,β-diphenylacrylate, methyl α-carbomethoxycinnamate, methyl α-cyano-β-methyl-p-methoxycinnamate or butyl α-cyano-β-methyl-p-methoxycinnamate, methyl α-carbomethoxy-p-methoxycinnamate and N-(β-carbomethoxy-β-cyanovinyl)-2-methylindoline.

2.2. Nickel compounds, for example nickel complexes of 2,2'-thio-bis[4-(1,1,3,3-tetramethylbutyl)phenol], such as the 1:1- or 1:2-complex, with or without additional ligands such as n-butylamine, triethanolamine or N-cyclohexyldiethanolamine, nickel dibutyldithiocarbamate, nickel salts of monoalkyl esters, such as of the methyl or ethyl ester, of 4-hydroxy-3,5-di-tert-butylbenzylphosphonic acid, nickel complexes of ketoximes, e.g. of 2-hydroxy-4-methylphenyl undecyl ketoxime, nickel complexes of 1-phenyl-4-lauroyl-5-hydroxypyrazole, with or without additional ligands.

2.3. Sterically hindered amines, for example bis(2,2,6,6-tetramethylpiperidin-4-yl)sebacate, bis(2,2,6,6-tetramethylpiperidin-4-yl)succinate, bis(1,2,2,6,6-pentamethylpiperidin-4-yl)sebacate, bis(1-octyloxy-2,2,6,6-tetramethylpiperidin-4-yl)sebacate, bis(1,2,2,6,6-pentamethylpiperidyl)n-butyl-3,5-di-tert-butyl-4-hydroxybenzylmalonate, the condensate of 1-hydroxyethyl-2,2,6,6-tetramethyl-4-hydroxypiperidine and succinic acid, the linear or cyclic condensates of N,N'-bis(2,2,6,6-tetramethyl-4-piperidyl) hexamethylenediamine and 4-tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl)1,2,3,4-butanetetraoate, 1,1'-(1,2-ethane-diyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro-[4.5]decane-2,4-dione, bis(1-octyloxy-2,2,6,6-tetramethylpiperidyl)sebacate, bis(1-octyl-oxy-2,2,6,6-tetramethylpiperidyl)succinate, the linear or cyclic condensates of N,N'-bis(2,2,6,6-tetramethyl-4-piperidyl) hexamethylenediamine and 4-morpholino-2,6-dichloro-1,3,5-triazine, the condensate of 2-chloro-4,6-di(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-amino-propylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, the condensate of N,N'-bis(2,2,6,6-tetramethyl-4-piperidyl)-hexamethylenediamine and 4-cyclohexylamino-2,6-dichloro-1,3,5-triazine, the condensate of 1,2-bis(3-aminopropylamino)ethane and 2,4,6-trichloro-1,3,5-triazine and also 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4.5]decane, the reaction product of 7,7,9,9-tetramethyl-2-cycloundecyl-1-oxa-3,8-diaza-4-oxospiro[4.5]decane and epichlorohydrine, 1,1-bis(1,2,2,6,6-pentamethyl-4-piperidyloxycarbonyl)-2-(4-methoxyphenyl)ether, N,N'-bis-formyl-N,N'-bis(2,2,6,6-tetramethyl-4-piperidyl)-hexamethylenediamine, the diester of 4-methoxymethylene-malonic acid with 1,2,2,6,6-pentamethyl-4-hydroxypiperidine, poly[methylpropyl-3-oxy-4-(2,2,6,6-tetramethyl-4-piperidyl)]siloxane, the reaction product of maleic anhydride-α-olefin copolymer and 2,2,6,6-tetramethyl-4-aminopiperidine or 1,2,2,6,6-pentamethyl-4-aminopiperidine.

2.4. Oxalamides, for example 4,4'-dioctyloxyoxanilide, 2,2'-diethoxy-oxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of o- and p-methoxy- and of o- and p-ethoxy-disubstituted oxanilides.

2.5. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6bis(2-(2-hydroxy-4-dodecyloxyphenyl)-4,6-bis(2,4-di-methylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)-phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example, N,N'-diphenyloxalamide, N-salicylal-N'-salicyloyl hydrazine, N,N'-bis(salicyloyl)hydrazine, N,N'-bis(3,5-di-tert-butyl-4-hydroxyphenyl-propionyl)-hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites, phosphines and phosphonites, for example triphenyl phosphite, diphenyl alkyl phosphites, phenyl dialkyl phosphites, tris(nonylphenyl) phosphite, trilauryl phosphite, trioctadecyl phosphite, trimethylphosphine, tri-n-butylphosphine, triphenylphosphine, distearyl pentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,6-di-tert-butyl-4-methylphenyl)pentaerythritol diphosphite, bisisodecyloxypentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyl-dibenzo[d,g]-1,3,2-dioxaphosphocin, bis(2,4-di-tert-butyl-6-methylphenyl)methylphosphite, bis(2,4-di-tert-butyl-6-methylphenyl)ethyl phosphite, 2,2',2"-nitrilo[triethyl-tris-(3,3',5,5"tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite.

Particular preference is given to using the following phosphites: Tris(2,4-di-tert-butylphenyl) phosphite (Irgafos®168, Ciba Specialty Chemicals), tris(nonylphenyl) phosphite and the phosphites selected from the group comprising the structural formulae (A), (B), (C), (D), (E), (F) and (G) given below:

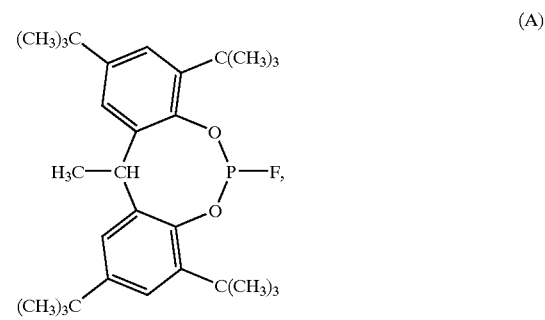

(A)

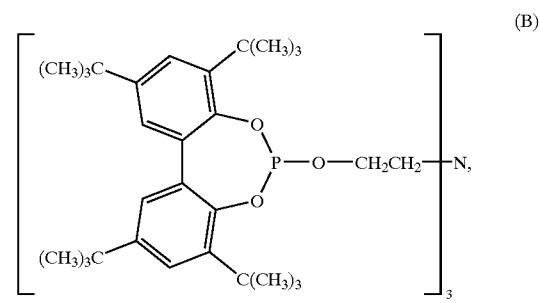

(B)

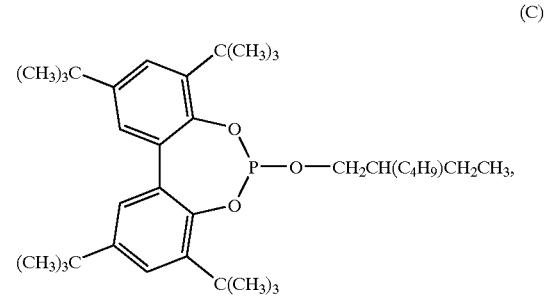

(C)

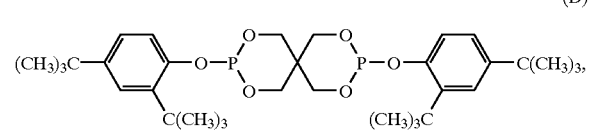

(D)

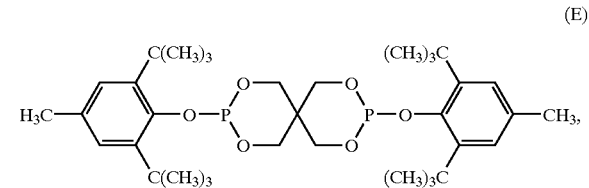

(E)

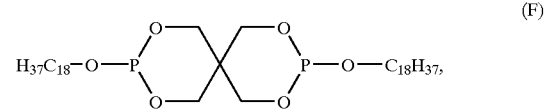

(F)

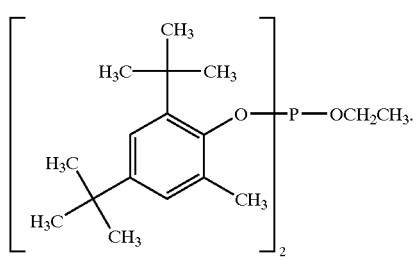

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-ditetradecylhydroxylamine, N-hexadecyl-N-octadecylhydroxylamine, N-heptadecyl-N-octadecylhydroxylamine, N,N-dialkylhydroxylamine from hydrogenated tallow fatty amines.
6. Nitrones, for example N-benzyl α-phenyl nitrone, N-ethyl α-methyl nitrone, N-octyl α-heptyl nitrone, N-lauryl α-undecyl nitrone, N-tetradecyl α-tridecyl nitrone, N-hexadecyl α-pentadecyl nitrone, N-octadecyl α-heptadecyl nitrone, N-hexadecyl α-heptadecyl nitrone, N-octadecyl α-pentadecyl nitrone, N-heptadecyl α-heptadecyl nitrone, N-octadecyl α-hexadecyl-nitrone, and nitrones derived from N,N-dialkylhydroxylamines prepared from hydrogenated tallow fatty amines.
7. Thiosynergists, for example dilauryl thiodiproprionate or distearyl thiodipropionate.
8. Peroxide scavengers, for example esters of β-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulphide, pentaerythritol tetrakis(β-dodecylmercapto)propionate.
9. Polyamide stabilisers, for example copper salts in combination with iodides and/or phosphorus compounds and salts of divalent manganese.
10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate, potassium palmitate, antimony pyrocatecholate or zinc pyrocatecholate.
11. Nucleating agents, for example inorganic substances, such as talc, metal oxides such as titanium dioxide or magnesium oxide, phosphates, carbonates or sulphates of, preferably, alkaline earth metals; organic compounds such as mono- or polycarboxylic acids and their salts, such as 4-tert-butylbenzoic acid, adipic acid, diphenyl acetic acid, sodium succinate or sodium benzoate, and polymeric compounds, for example ionic copolymers (ionomers).
12. Fillers and reinforcing agents, for example calcium carbonate, silicates, glass fibres, glass beads, talc, kaolin, mica, barium sulphate, metal oxides and hydroxides, carbon black, graphite, wood flour and flours or fibres of other natural products, and synthetic fibres.
13. Other additives, for example plasticizers, lubricants, emulsifiers, pigments, rheological additives, catalysts, levelling assistants, optical brighteners, flameproofing agents, antistatic agents, blowing agents.
14. Benzofuranones and indolinones, as described, for example, in U.S. Pat. No. 4,325,863; U.S. Pat. No. 4,338,244; U.S. Pat. No. 5,175,312, U.S. Pat. No. 5,216,052; U.S. Pat. No. 5,252,643; DE-A-4 316 611; DE-A-4 316 622; DE-A-4 316 876; EP-A-0 589 839 or EP-A-0 591 102, or 3-[4-(2-acetoxyethoxy)phenyl]-5,7-di-tert-butylbenzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butyl-benzofuran-2-one, 3-(2,3-dimethylphenyl)-5,7-di-tert-butylbenzofuran-2-one.

Another preferred embodiment of the invention relates to a polymerisable composition comprising
a) a catalytically effective amount of a penta- or hexavalent ruthenium or osmium carbene catalyst of the formulae:

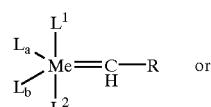

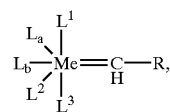

wherein
Me represents ruthenium;
$L_a$ and $L_b$ independently of one another represent anionic ligands;
$L^1$, $L^2$ and $L^3$ independently of one another represent monodentate, neutral e$^-$ donor ligands;
R represents aryl, arylthio or $C_3$–$C_5$-alkenyl; and
b) the chain transfer agent A(—Z)$_r$ and monomers capable of forming the compound (I), wherein A, B, B'X, X', Y, Y', Z, r, p, p', q and q' are as defined in claim 1.

A particularly preferred embodiment of the invention relates to a polymerisable composition comprising
a) a catalytically effective amount of a penta- or hexavalent ruthenium carbene catalyst selected from the group consisting of

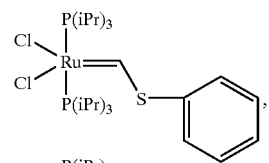

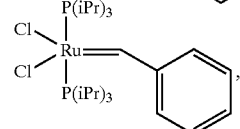

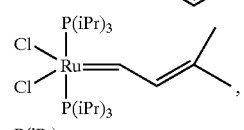

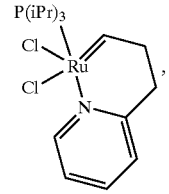

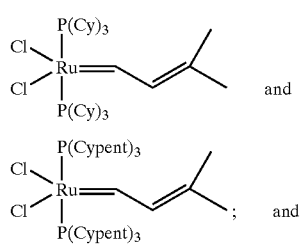
and

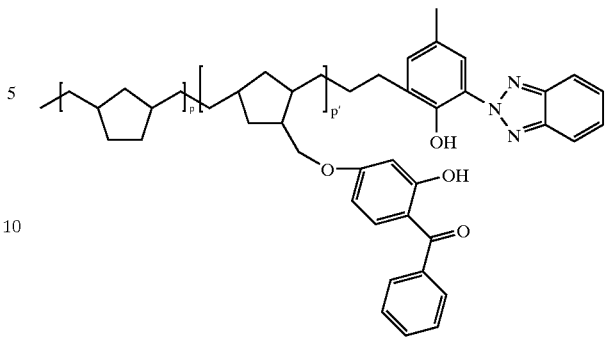

b) the chain transfer agent A(—Z)$_r$ and monomers capable of forming the compound (I), wherein A, B, B' X, X', Y, Y', Z, r, p, p', q and q' are as defined above.

The invention also relates to a process for preparing the compound (I) comprises applying the reaction conditions of Ring Opening Metathesis Polymerisation (=ROMP) to the polymerisable composition mentioned above. The invention also provides the polymers obtainable by the process of the invention.

The process for preparing the compound (I) is illustrated by the following reaction sequences:

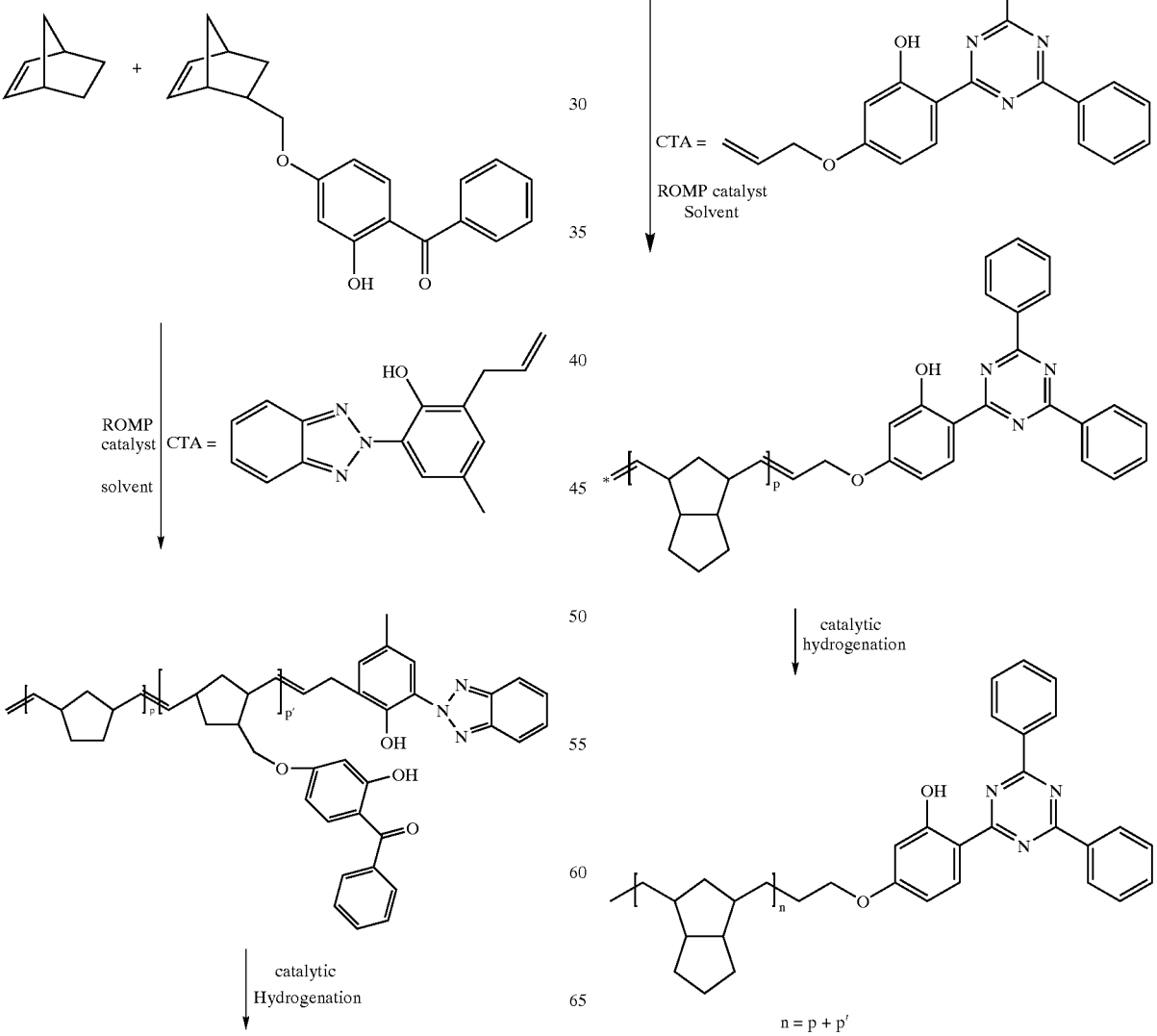

n = p + p'

The process is preferably carried out at a temperature of at least 0° C. In particular, the process of the invention is conducted at temperatures from 0° to 300° C., preferably at from room temperature to 250° C., with particular preference from room temperature to 200° C. and, with special preference, from room temperature to 160° C.

Chain transfer agents to which UV-light absorber moieties are attached, particularly chain transfer agents according to the embodiment b), may be prepared by attachment of a vinylic moiety to the UV-light absorber structure, e.g. by etherifying a hydroxy group with an open chain alkene, e.g. allyl chloride or bromide, which may then by followed by a Claisen rearrangement.

A representative reaction sequence illustrating the preparation of the chain transfer agent is given below:

The selective alkylation of one hydroxy group is due to the difference between the $pK_a$ of the two hydroxy groups. The reaction can be carried out in suitable solvents such as toluene, xylene, benzene acetone, methylethyl ketone, methanol, ethanol, isopropanol, tert-amyl-alcohol, dimethylacetamide, preferred acetone, methanol and dimethylacetamide in the presence of suitable bases, such as sodium hydroxide, potassium hydroxide, sodium carbonate potassium carbonate, pyridine triethylamine; preferably potassium carbonate. A preferred temperature range is from 0 to 200° C., preferably under reflux conditions.

In another reaction sequence as shown below the allylation step is performed as reported above followed by a thermal rearrangement, known as Claisen rearrangement (J. March Advanced Organic Chemistry; Fourth Edition; John Wiley & Sons). The rearrangement is preferably carried out in dimethylacetamide at 170° C.:

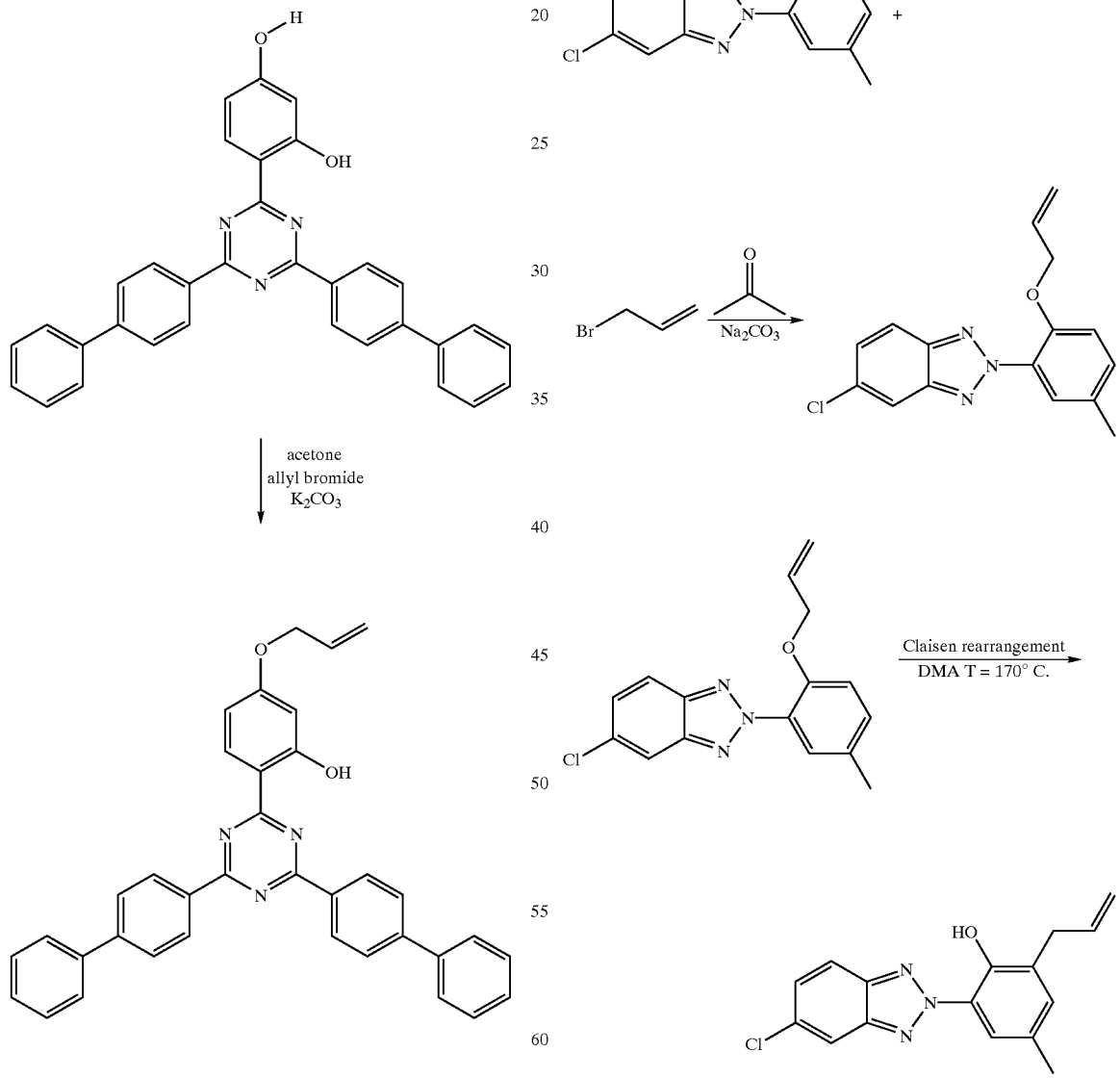

Branched ("polyfunctionalised") chain transfer agents (r=2, 3 or 4) can be synthesised according to the following representative reaction sequence:

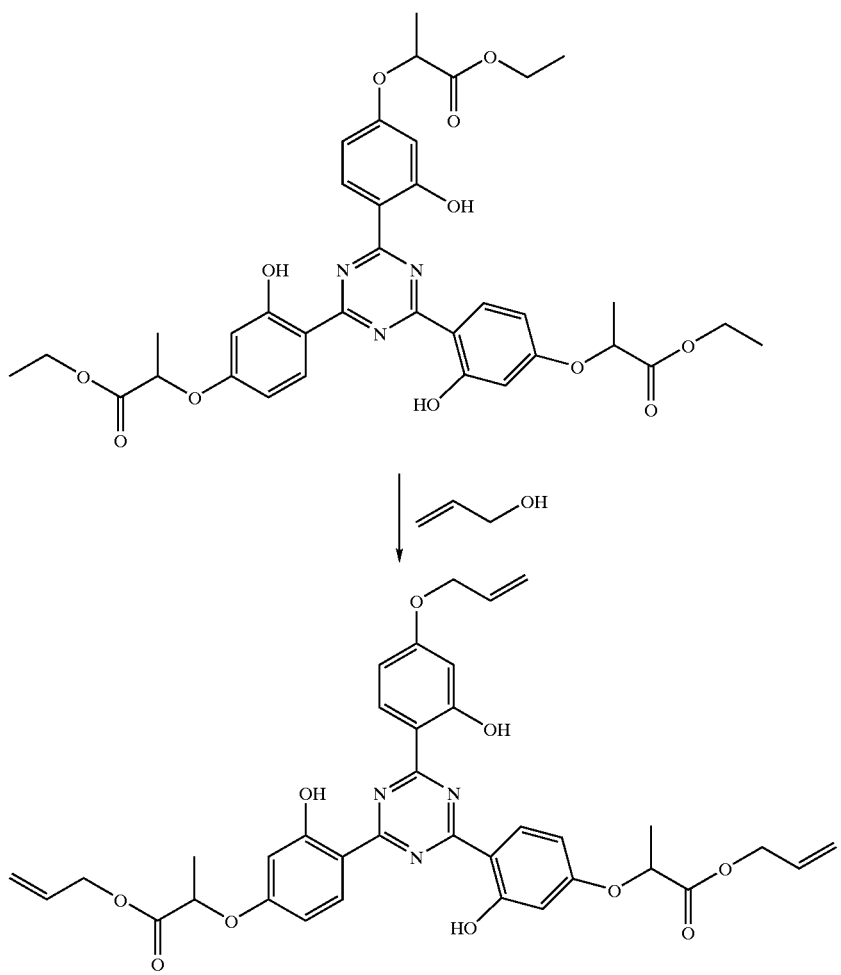

Depending on the nature and amount of the monomers used, the compounds or oligomers of the invention may have different properties. The compounds prepared from the polymerisable compositions show a longer persistency, due to their excellent compatibility with any polymeric substrate and their appropriate molecular weight, that avoids any additive loss caused by thermal effects.

Another embodiment of the invention relates to a composition comprising
  α) a composition of matter susceptible to degradation induced by light, heat or oxidation; and
  β) the compound (I), wherein A, B, B' X, X', Y, Y', Z, r, p, p', q and q' are as defined above.

A particularly preferred embodiment of the invention relates to a composition comprising
  α) a composition of matter susceptible to degradation induced by light, heat or oxidation selected from the group consisting of LDPE (=low density polyethylene), LLDPE (=linear low density polyethylene),EVA (=ethylene vinyl acetate), PP (=polypropylene) and PET (=polyethyleneterephthalate); and
  β) the compound (I), wherein A, B, B' X, X', Y, Y', Z, r, p, p', q and q' are as defined above.

The additives or auxiliaries listed above selected from the group consisting of antioxidants, UV-absorbers, light stabilisers, metal deactivators, phosphites, phosphines, phosphonites, hydroxylamines, nitrones, thiosynergists, peroxide scavengers, polyamide stabilisers, basic co-stabilisers, nucleating agents, fillers, reinforcing agents, benzofuranones, indolinones and other additives are present as optional components in the composition.

The polymers and compositions obtainable in accordance with the invention are particularly suitable for producing structural polymers, wherein protection against UV-radiation is desirable, such as protective foils for greenhouses, packaging foils, mouldings for cars, boats, leisure articles, pallets, pipes, sheets, etc.

The present invention, therefore, also relates to a method for stabilising a composition of matter against degradation induced by light, heat or oxidation, which comprises incorporating within the composition of matter the compound (I), wherein A, B, B' X, X', Y, Y', Z, r, p, p', q and q' are as defined above.

In particular, the present invention relates to a method for selectively screening the light radiation to which plants are exposed within green houses, which comprises incorporating within film material the compound (I), wherein A, B, B' X, X', Y, Y', Z, r, p, p', q and q' are as defined above.

In addition, the present invention relates to a method for selectively screening the light radiation to which packed food is exposed, which comprises incorporating within a film material the compound (I), wherein A, B, B' X, X', Y, Y', Z, r, p, p', q and q' are as defined above.

The following examples illustrate the invention without limiting the scope thereof:

Materials and Methods

In the following examples, the molecular weight parameters ($M_n$, $M_w$, PDI) is determined by GPC (Gel Permeation Chromatography). The GPC measurements are carried out on a Perkin Elmer LC 50 liquid chromatograph equipped with a reflective index Perkin Elmer LC 30 and the data are calculated by using a Perkin Elmer software (TurboSEC). All GPC measurements are carried out by using 0.02 M di-ethanol-amine solution in chromatographic grade tetrahydrofuran (THF) as solvent at 45° C. The columns used are PLGEL (Polymer Laboratories) 300 mm×7.5 mm, stationary phase 3 m Mixed E , supplied by Polymer Laboratories. Polystyrene standards are used for the calibration curve.

Visual melting points and melting ranges are measured by using a Gallenkamp equipment.

The extinction coefficients (ε) are calculated by recording the UV-spectra of the products in $CH_2Cl_2$ or toluene solutions on a Perkin Elmer Lambda 2S spectrophotometer. Elemental analysis is carried out by using a Perkin Elmer 2400-CHN equipment. The $^1$H-NMR spectra are recorded at 300 MHz and 22° C. in $CDCl_3$, by using a Bruker AMX300 NMR spectrometer.

The indices m and n correspond to the indices p and p' used and defined in the other parts of the description of the present invention.

EXAMPLE 1

1.1 Preparation of the Hydrogenated Oligomer as Represented by the Formula

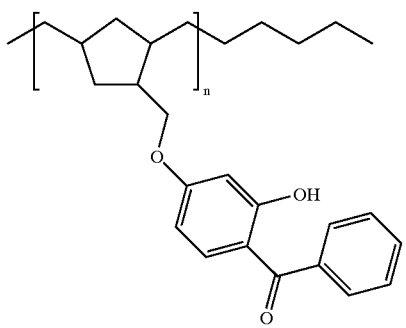

average n = 10

To a solution of 45 g (0.0014 mol) of the polymer of Example 1.2 in 100 ml of toluene, 0.4 g of platinum on carbon (10% W/W) are added. The mixture is poured into an auto-clave and hydrogenated for 24 hours at 65 bar ($p_{H2}$) and 105° C. The mixture is filtered off and the solution concentrated under vacuum. A pale yellow powder is received.

Visual melting range: 92–97° C.; $M_n$: 3300; $M_w$: 6000; PDI: 1.82; ε (290 nm, $CH_2Cl_2$): 14856;
Elemental analysis:

|  | % C | % H | % O |
|---|---|---|---|
| theory | 78.4 | 7.1 | 14.5 |
| found | 78.0 | 7.3 | 14.7 |

1.2 Preparation of the Oligomer of the Formula

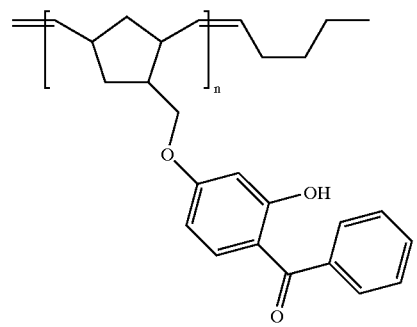

44.6 g (0.14 mol) of the compound of Example 1.3.1 and 1.17 g (0.014 mol) of 1-hexene are added to 450 ml toluene. 0.09 g (0.13 mmol) of the catalyst bis(tricyclopentylphosphine)dichloro(3-methyl-2-butenylidene)ruthenium (APT Cat ASMC 716) are added to the stirred solution and heated to 35° C. for 4 hours. The reaction mixture is then concentrated in the vacuum. A pale brown solid having a melting range of 88–94° C. is received.

Visual melting range: 102–107° C.; $M_n$: 3100; $M_w$: 5900; PDI: 1.90; ε (290 nm, $CH_2Cl_2$): 14521;
Elemental analysis:

|  | % C | % H | % O |
|---|---|---|---|
| theory | 78.9 | 6.5 | 14.6 |
| found | 78.5 | 6.7 | 14.8 |

1.3 The Starting Materials are Prepared as Follows
1.3.1 Preparation of

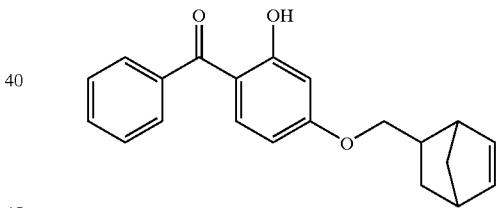

A solution of 250 g (1.0 mol) of the compound of Example 1.3.2 and 528 g (4.0 mol) of dicyclopentadiene in 1 l of mesitylene is refluxed for 24 hours. The mixture is cooled to room temperature and concentrated in the vacuum to recover any excess of dicyclopentadiene. The crude product is recrystallized from methanol.

Melting point: 105° C.; $^1$H NMR (300 MHz, $CDCl_3$): δ=12.6 (s, 1 H), 7.8–6.2 (aromatic signals 8H), 6.0 (m, 2H), 3.8 (m, 2H).

1.3.2 Preparation of

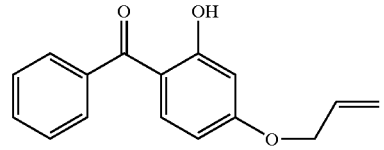

A solution of 214 g (1.0 mol) of 2,4-dihydroxybenzophenone, 121 g (1.0 mol) of allylbromide and 165 g (1.2 mol) of potassium carbonate in 500 ml of acetone are refluxed for 7 hours. The mixture is then filtered off and the solution concentrated in the vacuum. A pale yellow powder is recovered.

Melting point: 67° C.; $^1$H NMR (300 MHz, CDCl$_3$): δ=12.5 (bs, 1H), 8.0–7.5 (aromatic signals, 8H), 6.2 (m, 1H), 5.3 (m, 2H), 4.6 (m, 2H).

1.4 Application Example

In order to evaluate the UV-absorber characteristics of the polymer so obtained, when mixed with a commercial thermoplastic material, thin low density polyethylene (LDPE) films are prepared, containing, as a typical formulation, 0.8% by weight of the polymer. To do so, the polymer prepared as described in 1.2 is mixed with LDPE pellets (Riblene® FF 29, Enichem, Milano, Italy), characterised by a density of 0.921 g/cm$^3$ and a melt flow index (190° C./2.1 kg of 0.6) in a turbo mixer. The mixture is extruded at a maximum temperature of 200° C. in a OMC twin-screw extruder. The granules so obtained are blown in a lab scale Formac® blow-extruder at a maximum temperature of 210° C. to give a film of 150 μm thickness. UV-Vis spectra are recorded in the range of 200–800 nm by means of a Perkin-Elmer lambda 20 spectrophotometer, equipped with a RSA-PE-20 Labsphere integrating sphere. The film displays a strong absorption band in the range 280–360 nm. In particular, transmittance values below 3% are detected between 280 and 350 nm.

Another piece of film of the same composition is also exposed in a forced circulating air oven at 60° C., in order to evaluate the persistency of the polymer in LDPE. UV-Vis spectra are periodically measured on the exposed sample. The maximum absorbance value in the range 280–360 nm is taken as a measure of the persistency, possibly endangered by exposure of the film at high temperatures. The main finding is that no decrease of the absorbance value at maximum is observed after 5000 hours at 60° C.

EXAMPLE 2

2.1 Preparation of a Hydrogenated Oligomer of the Formula

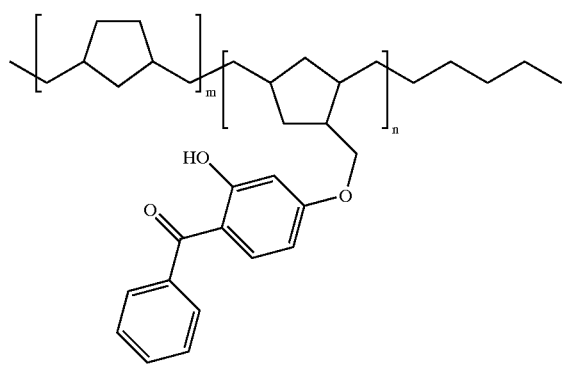

To a solution of 26.6 g (8.3 mmol) of the unsaturated polymerisate of Example 2.2 in 100 ml of toluene, 0.3 g of platinum on carbon (10% w/w) is added. The mixture is poured into an autoclave and hydrogenated for 24 hours at 65 bar (p$_{H2}$) and 105° C. The mixture is filtered off and the solution concentrated under vacuum. A pale yellow powder is obtained.

Visual melting range: 58–62° C.; M$_n$: 3400; M$_w$: 6290; PDI: 1.85; ε (290 nm, CH$_2$Cl$_2$): 13254;

Elemental analysis:

|  | % C | % H | % O |
|---|---|---|---|
| theory | 80.4 | 8.4 | 11.2 |
| found | 80.0 | 8.5 | 11.5 |

2.2 Preparation of the Oligomer of the Formula

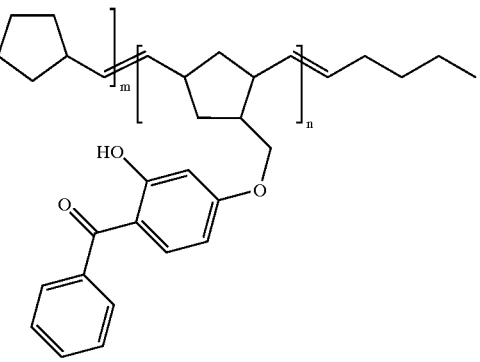

20.0 g (0.062 mol) of the compound of Example 1.3.1 and 5.9 g (0.062 mol) of norbornylene with 0.7 g (8.3 mmol) of 1-hexene are added to 450 ml of toluene. 0.09 g (0.13 mmol) of the catalyst bis(tricyclopentylphosphine)dichloro(3-methyl-2-butenylidene)ruthenium (APT Cat ASMC 716) are added to the stirred solution and heated to 35° C. for 4 hours. The reaction mixture is then concentrated in the vacuum. A pale brown solid having a melting range of 86–90° C. is received.

Visual melting range: 86–90° C.; M$_n$: 3420; M$_w$: 6975; PDI: 2.04; ε (290 nm, CH$_2$Cl$_2$): 14958;

Elemental analysis:

|  | % C | % H | % O |
|---|---|---|---|
| theory | 81.2 | 7.5 | 11.3 |
| found | 80.8 | 7.6 | 11.6 |

2.3 Application Example

Thin low density polyethylene (LDPE) films are prepared as described in Example 1.4, containing 0.8% by weight of the polymer. UV-Vis spectra are recorded as described in Example 1.4. The film displays a strong absorption band in the range 280–360 nm. Transmittance values below 3% are detected between 280 and 350 nm. The persistency of the polymer in LDPE films is determined after exposure of the films at 60° C. and evaluated as described in Example 1.4. No decrease of the absorbance value at the maximum is observed after 4000 hours at 60° C.

EXAMPLE 3

3.1 Preparation of the Hydrogenated Oligomer of the Formula

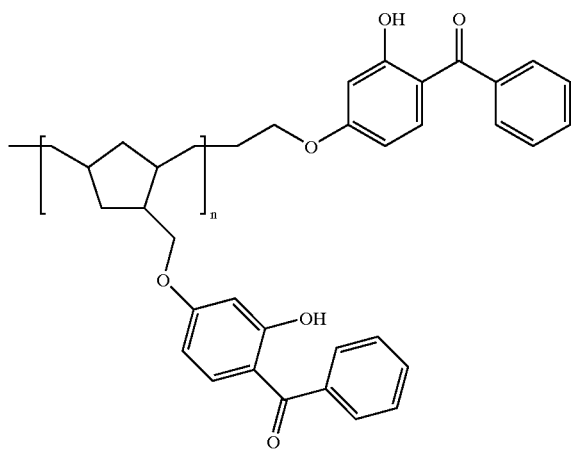

In a manner analogous to Example 1.1 the hydrogenated oligomer is obtained as a pale brown powder. Melting range: 92–97° C.; $M_n$: 2800.

3.2 Preparation of the Oligomer of the Formula

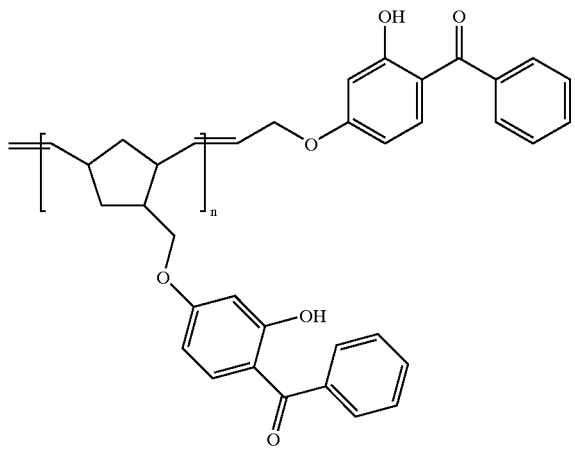

50.0 g (0.160 mol) of the compound of Example 1.3.1 and 5.0 g (0.02 mol) of the compound of Example 1.3.2 are added to 450 ml of toluene. 0.08 g (0.13 mmol) of the catalyst bis(triisopropylphosphine)dichlorovinylsulphanylruthenium are added to the stirred solution which is heated to 35° C. for 4 hours. The reaction mixture is then concentrated in the vacuum and a pale brown solid is received.

Visual melting range: 88–94° C.; $M_n$: 1810; $M_w$: 3440; PDI; 1.90; $\epsilon$ (290 nm, $CH_2Cl_2$);15734;

Elemental Analysis:

| | % C | % H | % O |
|---|---|---|---|
| theory | 78.3 | 6.2 | 15.5 |
| found | 77.2 | 6.3 | 16.5 |

EXAMPLE 4

4.1 Preparation of the Hydrogenated Oligomer of the Formula

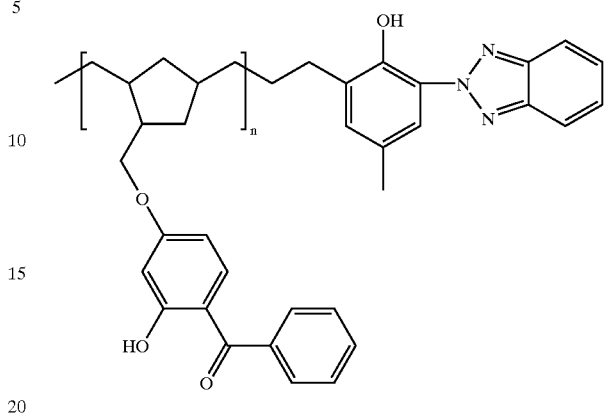

In a manner analogous to Example 1.1 a hydrogenated polymerisate is obtained as a pale brown powder. Visual melting range: 87–90° C.; $M_n$: 2300; $M_w$: 4870; PDI: 2.11; $\epsilon$ (290 nm, $CH_2Cl_2$): 15987

Elemental Analysis:

| | % C | % H | % O | % N |
|---|---|---|---|---|
| theory | 77.5 | 6.8 | 13.9 | 1.8 |
| found | 76.4 | 7.0 | 14.9 | 1.7 |

4.2 Preparation of the Oligomer of the Formula

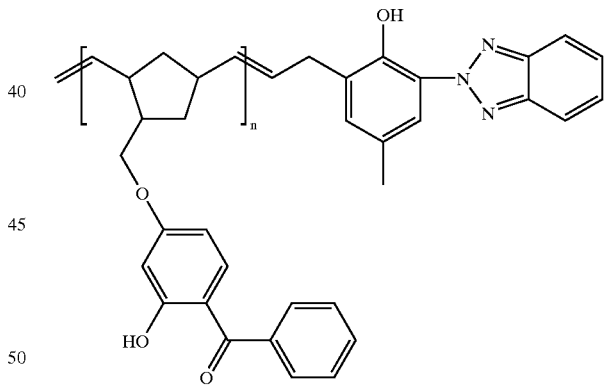

In a manner analogous to Example 1.2 a polymerisate is obtained as a pale brown powder by using the compound of Example 4.3.1 as the chain transfer agent.

Visual melting range: 100–108° C.; $M_n$: 2000; $M_w$: 3300; PDI: 1.65;

Elemental Analysis:

| | % C | % H | % O | % N |
|---|---|---|---|---|
| theory | 77.9 | 6.2 | 13.8 | 2.1 |
| found | 77.2 | 6.4 | 14.4 | 2.0 |

4.3 The Starting Materials are Prepared as Follows 4.3.1 Preparation of

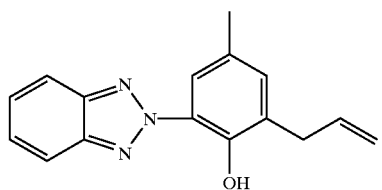

A solution of 110.0 g (0.40 mol) of the compound of Example 4.3.2 in 200 ml of N,N-di-methylacetamide is heated to 170° C. for 16 hours. The solution is cooled and concentrated in the vacuum. A pale yellow powder is received.

$^1$H NMR (300 MHz, CDCl$_3$): δ=11.1 (s, 1H), 8.2–6.8 (aromatic signals, 6H), 6.1 (m, 1H), 4.9 (m, 2H), 3.2 (m, 2H), 2.3 (s, 3H).

4.3.2 Preparation of

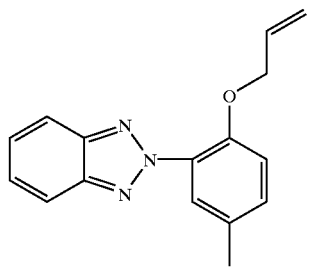

In a manner analogous to Example 1.2.3 an orange oil is obtained from the starting materials Tinuvin® P and allyl bromide.

$^1$H NMR (300 MHz, CDCl$_3$): δ=8.1–6.9 (aromatic signals, 7H), 5.9 (m, 1H), 5.1 (d, 1H), 4.9 (d, 1H), 4.5 (m, 2H), 2.3 (s, 3H).

4.4 Application Example

Thin low density polyethylene (LDPE) films are prepared as described in Example 1.4, containing 0.8% by weight of the polymer. UV-Vis spectra are recorded as described in Example 1.4. The film displays a strong absorption band in the range 280–360 nm. Transmittance values below 3% are detected between 280 and 340 nm. The persistency of the polymer in LDPE films is determined after their exposure at 60° C. and evaluated as described in Example 1.4. No decrease of the absorbance value at maximum is observed after 2600 hours at 60° C.

EXAMPLE 5

5.1 Preparation of the Hydrogenated Oligomer of the Formula

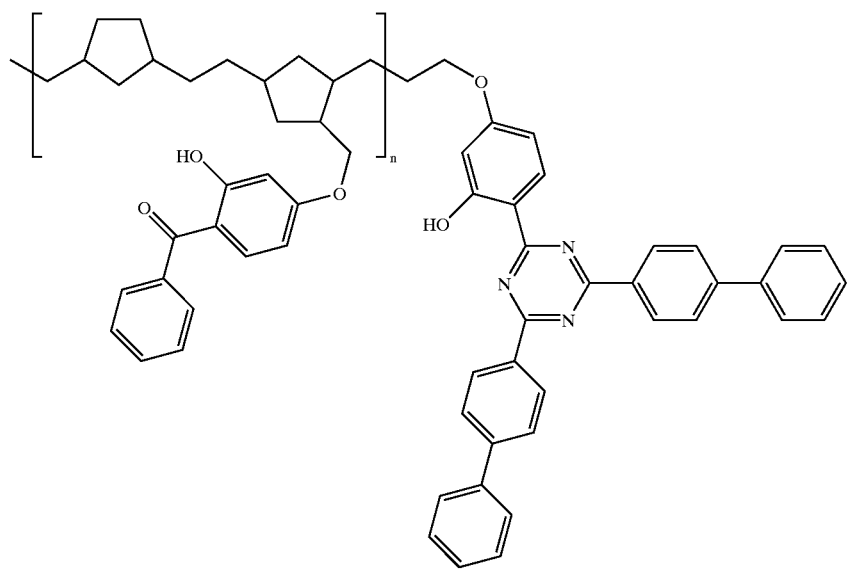

In a manner analogous to Examples 2.1 and 2.2 a pale yellow powder is obtained by using the compound of Example 5.2 as the chain transfer agent.

Visual melting range: 100–110° C.: $M_n$: 2700; $M_w$: 5750; PDI: 2.13; ε (290 nm, CH$_2$Cl$_2$): 21805

Elemental Analysis:

|  | % C | % H | % O | % N |
|---|---|---|---|---|
| theory | 80.4 | 7.6 | 10.5 | 1.5 |
| found | 79.2 | 7.5 | 11.7 | 1.6 |

5.2 Preparation of the Starting Material of the Formula

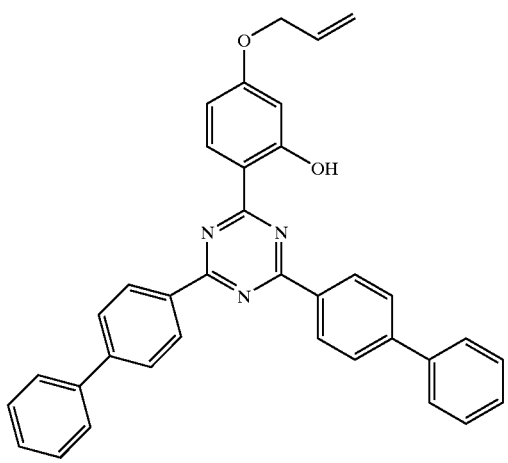

In a manner analogous to Example 1.3.2 a white powder is obtained from the starting material: 4-(4,6-bis-biphenyl-4-yl-(1,3,5)triazin-2-yl)-benzene-1,3-diol and allyl bromide.

$^1$H NMR (300 MHz, CDCl$_3$): δ=13.3 (s, 1H), 8.7–6.2 (aromatic signals, 21H), 6.1 (m, 1H), 5.3 (m, 2H), 4.3 (m, 2H).

5.3 Application Example

Thin low density polyethylene (LDPE) films are prepared as described in Example 1.4, containing 0.6% by weight of the polymer. UV-Vis spectra are recorded as described in Example 1.4. The film displays a strong absorption band in the range 280–360 nm. Transmittance values below 3% are detected between 280 and 350 nm. The persistency of the polymer in LDPE films is determined after their exposure at 60° C. and evaluated as described in Example 1.4. No decrease of the absorbance value at maximum is observed after 1700 hours at 60° C.

EXAMPLE 6

6.1 Preparation of the Hydrogenated Oligomer of the Formula

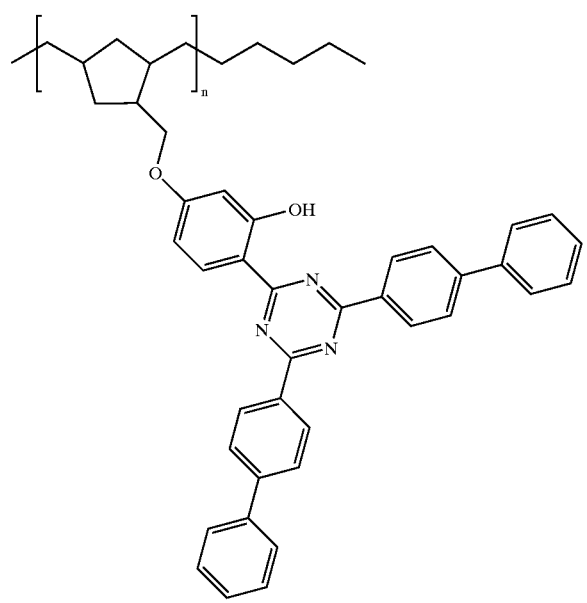

In a manner analogous to Examples 1.1 and 1.2 a pale yellow powder (melting range: 164–179° C. M$_n$: 2000) is obtained by using the compound of Example 6.2 as a monomer.

Visual melting range: 164–169° C.; M$_n$: 2080; M$_w$: 3080; PDI: 1.48; ε (317 nm, CH$_2$Cl$_2$): 68006;

Elemental Analysis:

|  | % C | % H | % O | % N |
| --- | --- | --- | --- | --- |
| theory | 81.6 | 6.3 | 5.4 | 6.7 |
| found | 79.3 | 6.2 | 8.0 | 6.5 |

6.2. Preparation of the Starting Material of the Formula

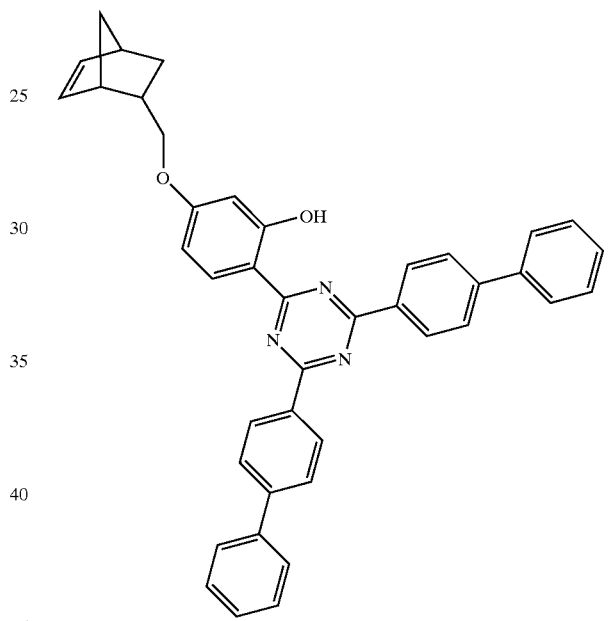

In a manner analogous to Example 1.3.1 a white powder is obtained from the starting material of Example 5.2.

$^1$H NMR (300 MHz, CDCl$_3$): δ=13.2 (s, 1H), 8.9–6.8 (aromatic signals, 21H), 6.1 (m, 2H).

6.3 Application Example

Thin low density polyethylene (LDPE) films are prepared as described in Example 1.4, containing 0.4% by weight of the polymer. UV-Vis spectra are recorded as described in Example 1.4. The film displays a strong absorption band in the range 280–360 nm. Transmittance values below 3% are detected between 300 and 340 nm. The persistency of the polymer in LDPE films is determined after their exposure of the films at 60° C. and evaluated as described in Example 1.4. No decrease of the absorbance value at maximum is observed after 4000 hours at 60° C.

EXAMPLE 7
7.1 Preparation of

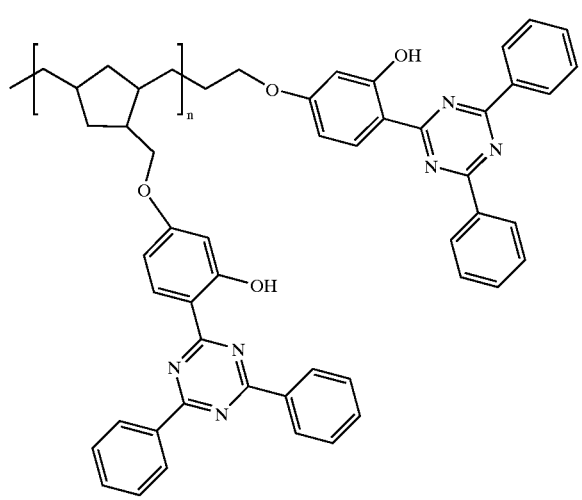

In a manner analogous to Examples 1.1 and 1.2 a pale yellow powder (melting range: 143–151° C., $M_n$: 2800) is obtained by using the compound of Example 7.2.2 as the chain transfer agent.

Visual melting range: 143–151° C.; $M_n$: 2000; $M_w$: 3200; PDI: 1.60; ε (290 nm, $CH_2Cl_2$): 39267;

Elemental analysis:

|  | % C | % H | % O | % N |
| --- | --- | --- | --- | --- |
| theory | 77.1 | 5.9 | 8.2 | 8.8 |
| found | 76.5 | 6.2 | 8.1 | 9.2 |

7.2 The Starting Materials are Prepared as Follows
7.2.1 Preparation of

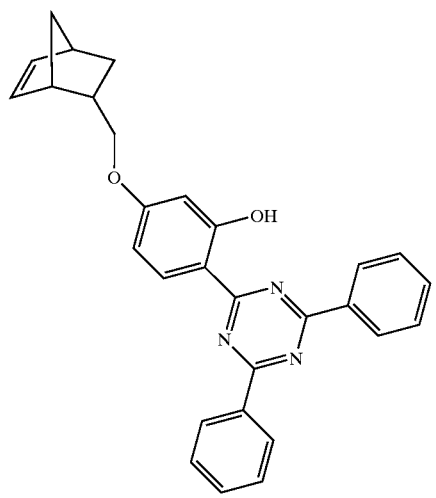

In a manner analogous to Example 1.2.2 a white powder (melting range 151–161° C.) is obtained from the starting material of Example 7.2.2.

Visual melting range: 151–161° C.; $^1$H NMR (300 MHz, $CDCl_3$): δ=12.6 (s, 1H), 8.5–7.5 (aromatic signals, 13H), 6.5 (m, 2H), 3.9 (m, 2H).

7.2.2 Preparation of

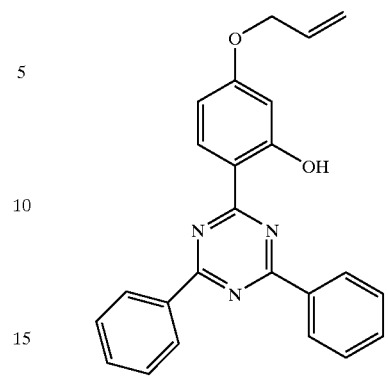

In a manner analogous to Example 1.2.3 a white solid (melting range 171–181° C.) is obtained from 4-(4,6-diphenyl-(1,3,5)triazin-2-yl)-benzene-1,3-diol and allyl bromide.

Visual melting range: 171–181° C.; $^1$H NMR (300 MHz, $CDCl_3$): δ=13.6 (s, 1H), 8.5–7.5 (aromatic signals, 13H), 6.6 (m, 1H), 5.4 (m, 2H), 4.5 (m, 2H).

7.3 Application Example

Thin low density polyethylene (LDPE) films are prepared as described in Example 1.4 containing 0.4% by weight of the polymer. UV-Vis spectra are recorded as described in Example 1.4. The film displays a strong absorption band in the range 280–360 nm. Transmittance values below 3% are detected between 280 and 340 nm. The persistency of the polymer in LDPE films is determined after their exposure at 60° C. and evaluated as described in Example 1.4. No decrease of the absorbance value at maximum is observed after 4000 hours at 60° C.

EXAMPLE 8
8.1 Preparation of the Hydrogenated Oligomer of the Formula

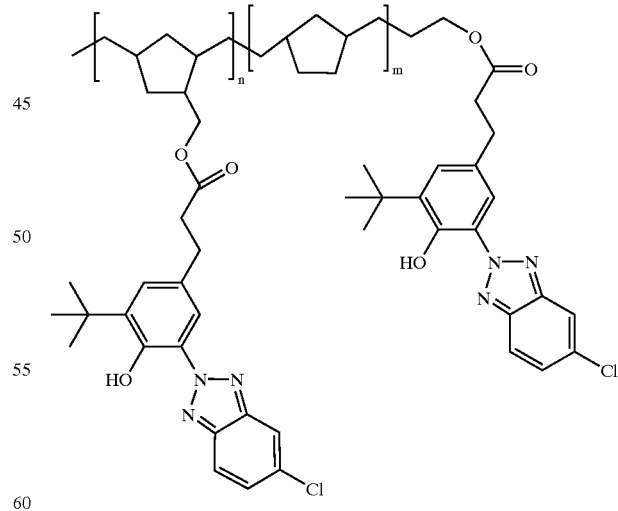

In a manner analogous to Examples 2.1 and 2.2 a pale yellow powder is obtained by using the product of Example 8.2.1 as the monomer and the product of Example 8.2.2 as the chain transfer agent.

Visual melting range: 80–90° C.; $M_n$: 2600; $M_w$: 6340; PDI: 2.44; ε (290 nm, $CH_2Cl_2$): 9074;

Elemental analysis:

|        | % C  | % H | % O | % N | % Cl |
|--------|------|-----|-----|-----|------|
| theory | 69.5 | 7.4 | 8.9 | 7.7 | 6.5  |
| found  | 70.9 | 7.7 | 9.3 | 6.7 | 5.4  |

8.2 The Starting Materials are Prepared as Follows 8.2.1 Preparation of

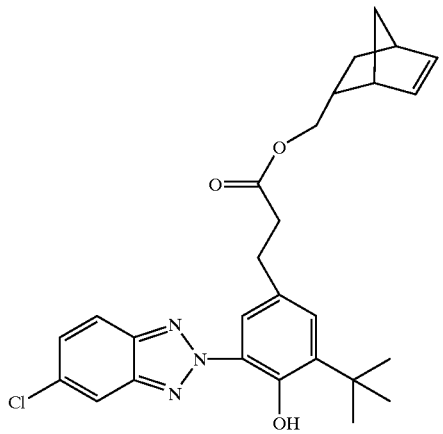

In a manner analogous to Example 1.3.1 a white solid is obtained from the starting material of Example 8.2.2.

Visual melting range: 35–39° C.; $^1$H NMR (300 MHz, CDCl$_3$): δ=11.5 (s, 1H), 8.3–7.1 (aromatic signals, 5H), 6.1 (m, 2H), 3.9 (m, 2H), 1.5 (s, 9H).

8.2.2 Preparation of

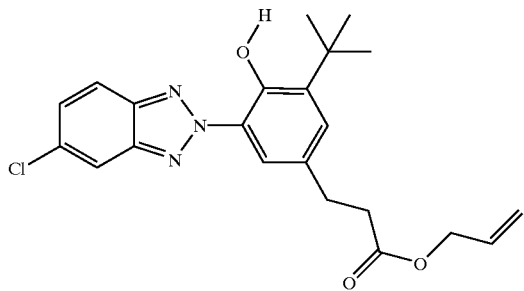

75.0 g (0.193 mol) of 3-(3-tert-butyl-5-(5-chloro-benzotriazol-2-yl)-4-hydroxy-phenyl)-propionic acid methyl ester and 30.0 g (0.517 mol) of allyl alcohol and 0.3 g (1.6 mmol) of PTSA are dissolved in 250 ml of toluene. The mixture is poured in an autoclave and heated at 110° C. for 24 hours. The organic layer is washed with water, dried under anhydrous sodium sulphate and evaporated under vacuum. A white powder is obtained.

$^1$H NMR (300 MHz, CDCl$_3$): δ=12.0–10.0 (bs, 1H), 8.4–7.4 (aromatic signals, 5H), 5.9 (m, 1H), 5.3 (m, 2H), 4.6 (m, 2H), 3.0 (m, 2H), 2.7 (m, 2H), 1.5 (s, 9H).

8.3 Application Example

In order to evaluate the UV-absorber characteristics of the compound so obtained, when mixed with a commercial thermoplastic material, thin linear low density polyethylene (LLDPE) films are prepared, containing, as a typical formulation, 1% by weight of the compound. To do so, the polymer prepared as described in 8.1 is mixed with milled LLDPE (Dowlex® NG 5056E, Dow Chemical), characterised by a density of 0.919 g/cm$^3$ and a melt flow index (190° C./2.1 kg) of 1.1, and extruded at a maximum temperature of 230° C. in a OMC twin-screw extruder. The granules so obtained are blown in a lab-scale Formac blow-extruder at a maximum temperature of 230° C. to give a film of about 50 μm thickness. UV-Vis spectra are recorded in the range 200–800 nm by means of a Perkin-Elmer lambda 20 spectrophotometer, equipped with a RSA-PE-20 Labsphere integrating sphere. The film displays an absorption in the UV region, with transmittance values below 25% between 300 and 380 nm. Another piece of film of the same composition is stored at room temperature inside an envelope and between two pieces of paper. The film is periodically inspected visually to verify possible exudation (blooming) of the compound from the bulk of the polymeric matrix. After 500 hours no blooming occurred.

EXAMPLE 9

9.1 Preparation of the Hydrogenated Oligomer of the Formula

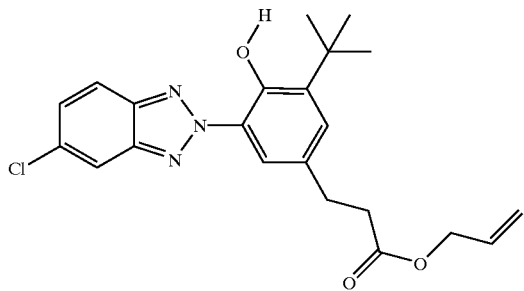

In a manner analogous to Example 1.1 the oligomer as represented by the structural formula of above is obtained as a white powder by using dicyclopentadiene as the monomer and the compound of Example 5.2 as the chain transfer agent.

Visual melting range: 96–108° C.; $M_n$: 1400; $M_w$: 2400; PDI: 1.71; ε (290 nm, CH$_2$Cl$_2$): 4341, Elemental analysis:

|        | % C  | % H | % O | % N |
|--------|------|-----|-----|-----|
| theory | 85.5 | 9.6 | 2.2 | 2.7 |
| found  | 83.9 | 8.9 | 4.2 | 3.0 |

9.2 Application Example

Thin low density polyethylene (LDPE) films are prepared as described in Example 1.4. They are 150 μm thick and contain 0.5% of the compound. UV-Vis spectra are recorded as described in Example 1.4. The film displays a strong absorption in the range 280–360 nm. Transmittance values below 3% are detected in the range 290–350 nm. The persistency of the polymer in LOPE films is determined after exposure of the films at 60° C. and evaluated as described in Example 1.4. No decrease of the absorbance value at the maximum is observed after 3000 hours at 60° C.

10.2 Application Example

Thin linear low density polyethylene (LLDPE) films are prepared as described in Example 8.3. They are 50 μm thick and contain 1% of the compound. UV-Vis spectra are recorded as described in Example 1.4. The film displays an absorption in the UV region, with transmittance values below 40% between 300 and 380 nm. The compatibility in LLDPE films is determined after storage of the films at room temperature and evaluated as described in Example 8.3. After 300 hours no blooming occurred.

EXAMPLE 11

11.1 Preparation of the Hydrogenated Oligomer of the Formula

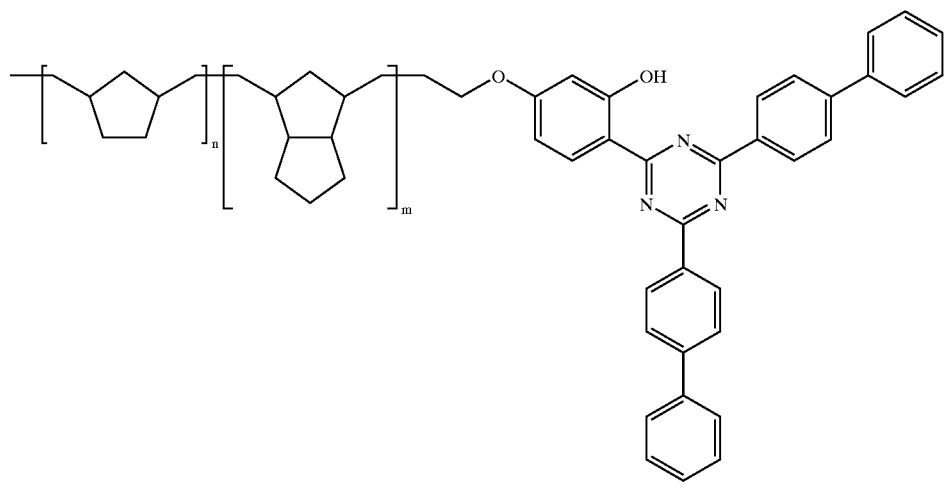

EXAMPLE 10

1.1 Preparation of the Hydrogenated Oligomer of the Formula

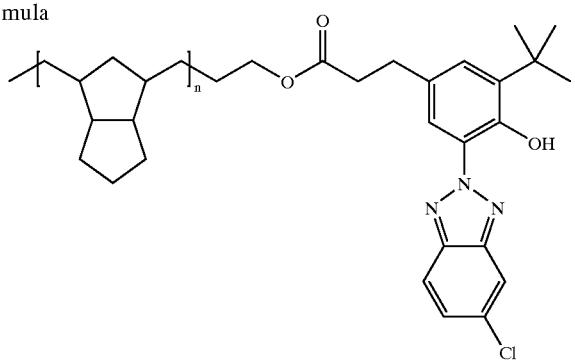

In a manner analogous to Example 9 the oligomer of above is obtained as a yellow powder by using dicyclopentadiene as the monomer and the compound of Example 8.2.2 as the chain transfer agent.

Visual melting range: 59–64° C.; $M_n$: 1320; $M_n$: 2220; PDI: 1.68;
Elemental analysis:

|  | % C | % H | % O | % N | % Cl |
|---|---|---|---|---|---|
| theory | 80.4 | 10.1 | 3.7 | 3.1 | 2.7 |
| found | 78.3 | 9.6 | 6.0 | 3.2 | 2.9 |

To a solution of 92 g (0.050 mol) of the oligomer of Example 11.2 in 300 ml of xylene, 1.0 g of platinum on carbon (10% w/w) is added. The mixture is poured into an autoclave and hydrogenated for 24 hours at 65 bar ($p_{H2}$) and 105° C. The hydrogenated mixture is purified from the catalyst by adding 10 g of Tonsyl© 414 FF at 80–90° C. and left under vigorous stirring for 2 hours. After filtering off over a pad of 10 g of Tonsil the filtrated yellow solution is concentrated under vacuum and a pale yellow solid is obtained.

Visual melting range: 55–68° C.; $M_n$: 2197; $M_w$: 4347; PDI: 1.98; ε (290 nm, toluene): 34574;

Elemental analysis:

|  | % C | % H | % N |
|---|---|---|---|
| theory | 85.8 | 10.2 | 2.2 |
| found | 84.7 | 10.2 | 2.0 |

11.2 Preparation of the Oligomer of the Formula

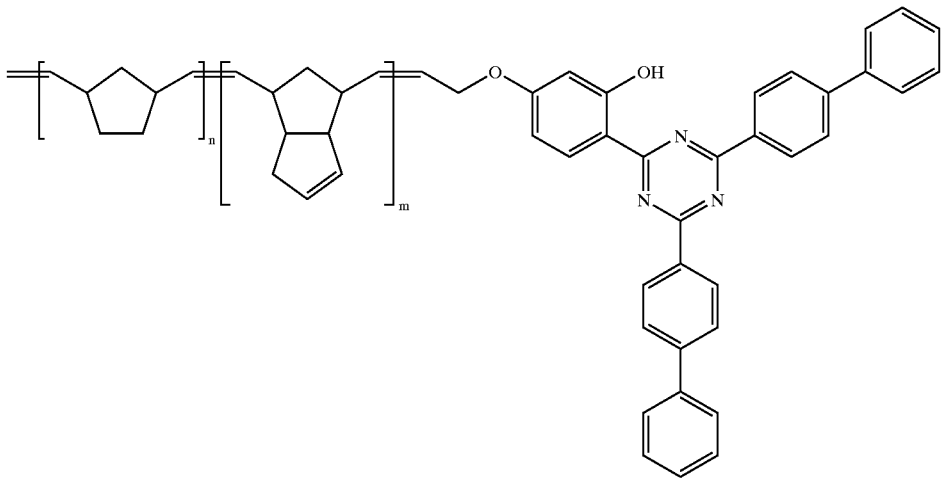

30 g (0.056 mol) of the compound from Example 5.2 and 30.2 g (0.320 mol) of norbornylene and 42.3 g (0.320 mol) of dicyclopentadiene and 0.49 g (0.6 mmol) of the catalyst bis(tricyclopentylphosphine)dichloro(3-methyl-2-butenylidene)ruthenium (APT Cat ASMC 716) are added to 300 ml of toluene. The mixture is left to react for 24 hours at 30°. The solution is then concentrated under vacuum and a pale brown solid is obtained.

Visual melting range: 168–180° C.; $M_n$: 2216; $M_w$: 4663; PDI: 2.10;

Elemental analysis:

|  | % C | % H | % N |
|---|---|---|---|
| theory | 87.5 | 8.4 | 2.3 |
| found | 85.8 | 8.6 | 2.1 |

11.3 Application Example

Thin low density polyethylene (LDPE) films are prepared as described in Example 1.4. They are 150 μm thick and contain 0.5% of the compound. UV-Vis spectra are recorded as described in Example 1.4. The film displays a strong absorption in the range 280–360 nm. Transmittance values below 3% are detected in the range 290–350 nm.

The persistency of the polymer in LDPE films is determined after exposure of the films at 60° C. and evaluated as described in Example 1.4. No decrease of the absorbance value at the maximum is observed after 3000 hours at 60° C.

EXAMPLE 12

12.1 Preparation of the Hydrogenated Oligomer of the Formula

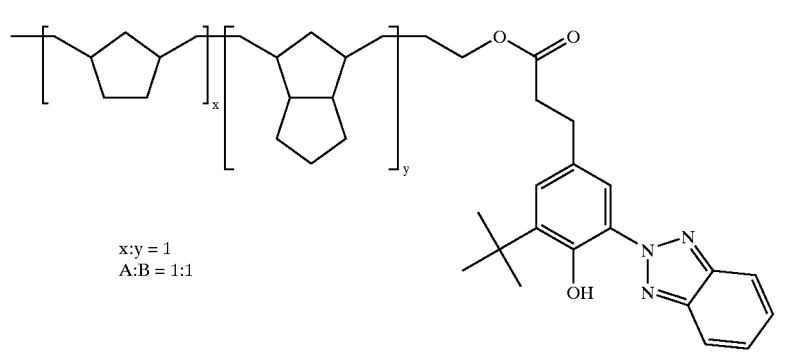

A x:y = 1
A:B = 1:1

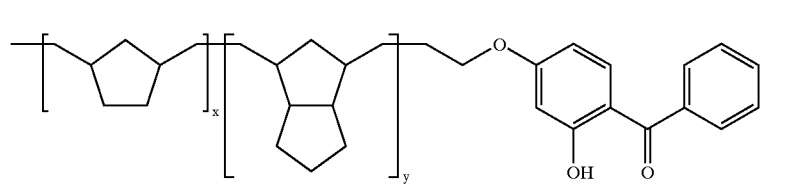

B

Following the procedure described in the Example 11.1 the oligomer is obtained as a pale brown product.

$M_n$: 962; $M_w$: 1599; PDI: 1.66; ε (290 nm, toluene): 8038; Elemental analysis:

|  | % C | % H | % N |
|---|---|---|---|
| theory | 81.2 | 9.9 | 2.7 |
| found | 80.5 | 9.9 | 2.5 |

12.2 Preparation of an Oligomer of the Formula

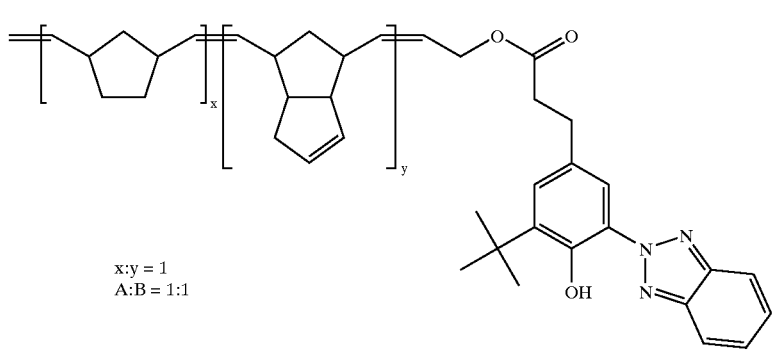

a yellow viscous product is obtained in a manner analogous to Example 11.2 $M_n$: 981; $M_w$: 1680; PDI: 1.71.

12.3 Application Example

Thin low density polyethylene (LDPE) films are prepared as described in Example 1.4. They are 150 μm thick and contain 1.0% of the compound. UV-Vis spectra are recorded as described in Example 1.4. The film displays a strong absorption in the range 280–360 nm. Transmittance values below 3% are detected in the range 280–350 nm. The persistency of the polymer in LDPE films is determined after exposure of the films at 60° C. and evaluated as described in Example 1.4. No decrease of the absorbance value at the maximum is observed after 1000 hours at 60° C.

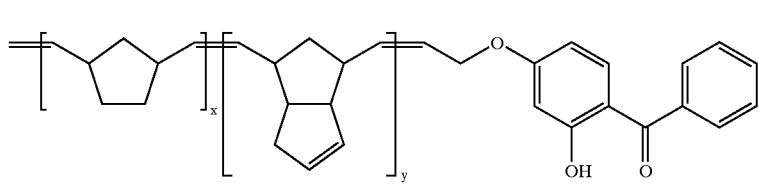

By using as chain transfer agents the compounds from Example 1.3.2 and the product shown below:

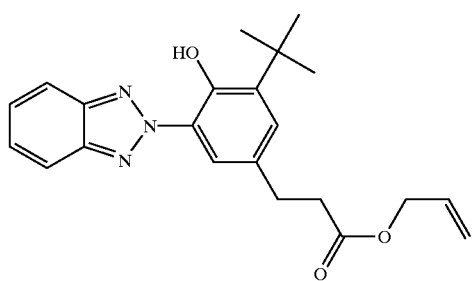

EXAMPLE 13

13.1 Preparation of the Hydrogenated Oligomer of the Formula

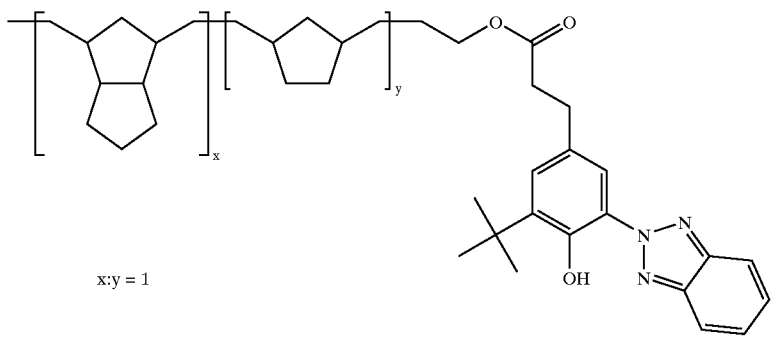

In a manner analogous to Example 11 and by using the compound of Example 12.3 as the chain transfer agent a yellow viscous product is obtained.

$M_n$: 1754; $M_w$: 3694; PDI: 2.11; $\epsilon$ (290 nm, toluene): 9931;

Elemental analysis:

|  | % C | % H | % N |
|---|---|---|---|
| theory | 83.8 | 11.0 | 2.4 |
| found | 83.3 | 10.7 | 3.2 |

13.2 Application Example

Thin low density polyethylene (LDPE) films are prepared as described in Example 1.4. They are 150 μm thick and contain 1.5% of the compound. UV-Vis spectra are recorded as described in Example 1.4. The film displays a strong absorption in the range 280–360 nm, with transmittance values below 3%. The persistency of the polymer in LDPE films is determined after exposure of the films at 60° C. and evaluated as described in Example 1.4. No decrease of the absorbance value at the maximum is observed after 1000 hours at 60° C.

EXAMPLE 14

14.1 Preparation of the Hydrogenated Oligomer of the Formula

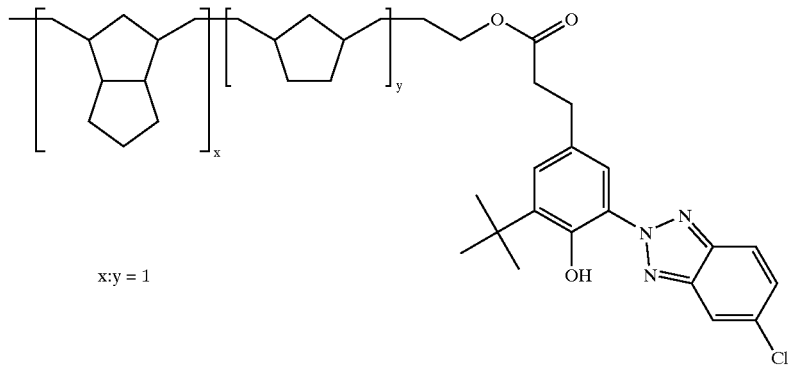

x:y = 1

According to the method as described in the example 11 and by using the compound of example 8.2.2 as CTA a yellow viscous product is obtained.

$M_n$: 1823; $M_w$: 2948; PDI: 1.62; $\epsilon$ (290 nm, toluene): 1778;

Elemental analysis:

|  | % C | % H | % N | % Cl |
|---|---|---|---|---|
| theory | 82.3 | 10.8 | 2.3 | 1.9 |
| found | 80.3 | 10.5 | 3.0 | 2.5 |

14.2 Application Example

Thin linear low density polyethylene (LLDPE) films are prepared as described in Example 8.3. They are 50 μm thick and contain 1% of the compound. UV-Vis spectra are recorded as described in Example 1.4. The film displays an absorption in the UV region, with transmittance values below 50% between 300 and 380 nm. The compatibility in LLDPE films is determined after storage of the films at room temperature and evaluated as described in Example 8.3. After 500 hours no blooming occurred.

EXAMPLE 15

15.1 Preparation of the Hydrogenated Oligomer of the Formula

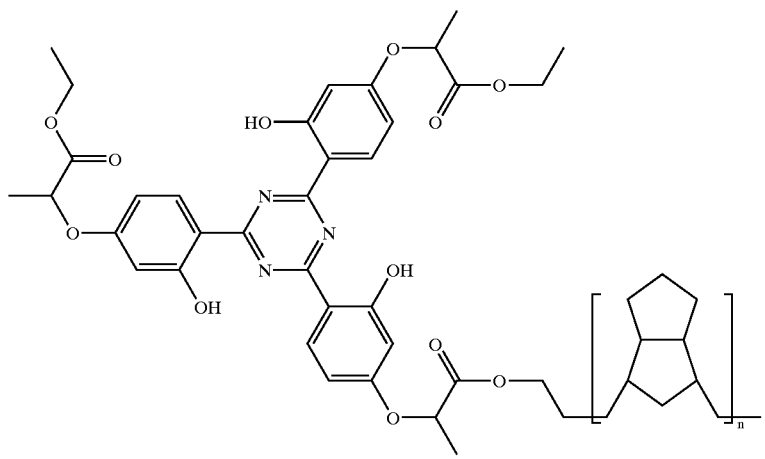

According to the method as described in Example 9 and by using as the chain transfer agent the product reported below:

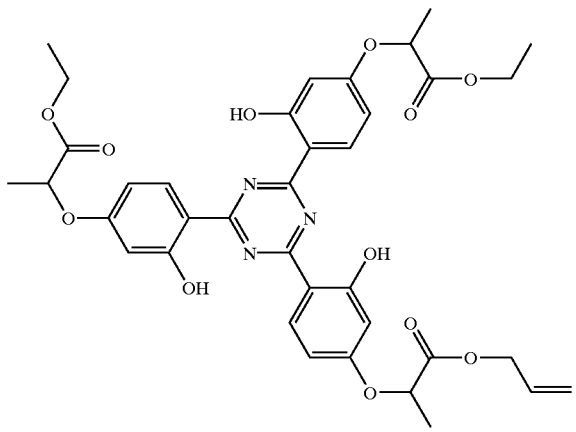

a pale yellow powder is obtained.

Visual melting range: 127–136° C.; $M_n$: 1672; $M_w$: 3613; PDI: 2.16; $\epsilon$ (290 nm, toluene): 13290;

Elemental analysis:

|  | % C | % H | % N |
|---|---|---|---|
| theoretic | 76.8 | 9.2 | 2.5 |
| found | 77.0 | 9.4 | 2.1 |

15.2 Application Example

Thin linear low density polyethylene (LLDPE) films are prepared as described in Example 8.3. They are 50 μm thick and contain 1% of the compound.

EXAMPLE 16

16.1 Preparation of the Star-shaped Product of Formula

Analogous to the method as described in Example 1.1 and by using norbornylene as the monomer and the compound shown below as the chain transfer agent:

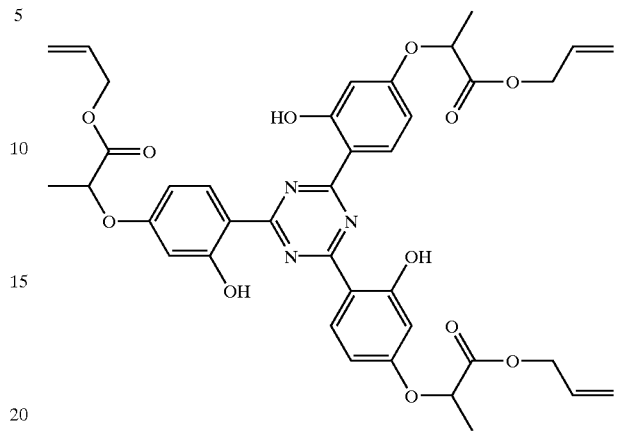

a yellow solid is obtained.

Visual melting range: 85–90° C.; $M_n$: 3623; $M_w$: 5575; PDI: 1.54; $\epsilon$ (290 nm, toluene): 15643;

Elemental analysis:

|  | % C | % H | % N |
|---|---|---|---|
| theory | 79.8 | 10.5 | 1.7 |
| found | 79.4 | 10.5 | 1.6 |

16.2 Application Example

Thin linear low density polyethylene (LLDPE) films are prepared as described in Example 8.3. They are 50 μm thick and contain 2% of the compound. UV-Vis spectra are recorded as described in Example 1.4. The film displays an absorption in the UV region, with transmittance values below 15% between 300 and 380 nm. The compatibility in LLDPE films is determined after storage of the films at room temperature and evaluated as described in Example 8.3. After 500 hours no blooming occurred.

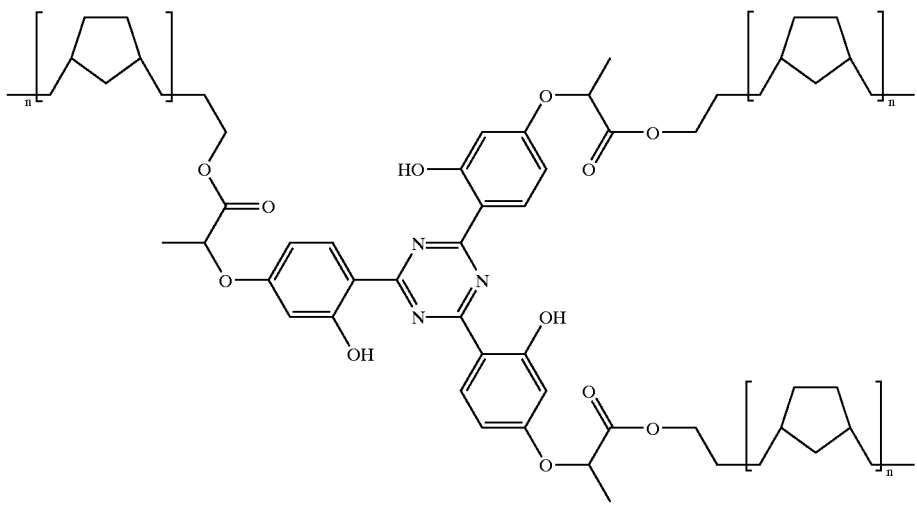

EXAMPLE 17

17.1 Preparation of the Star-shaped Product of Formula

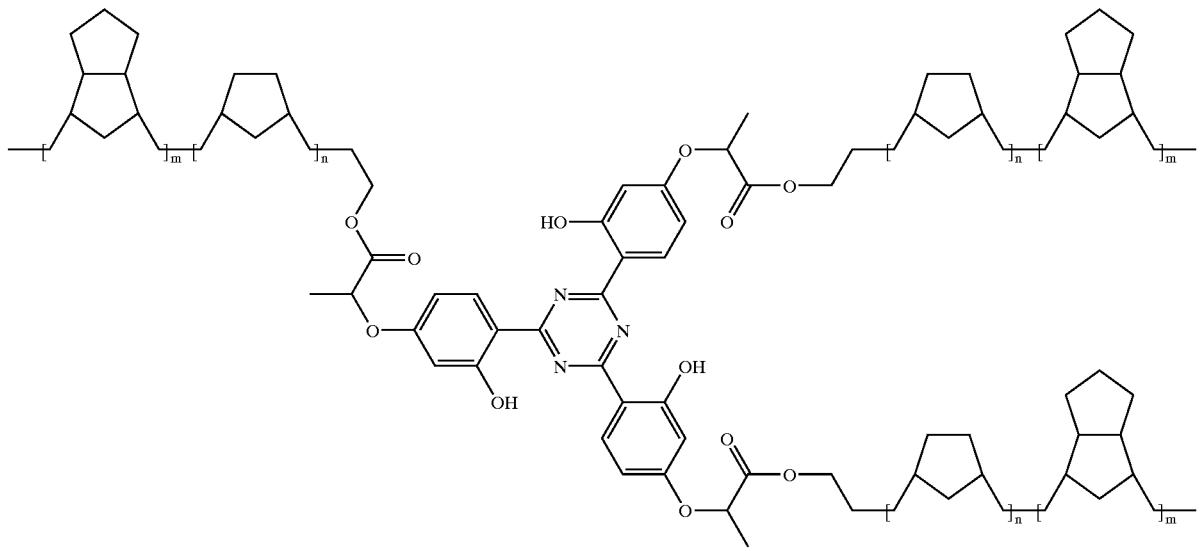

In a manner analogous to Example 11 and by using the same chain transfer agent as in Example 16 a viscous yellow product is obtained.

$M_n$: 2549; $M_w$: 4352; PDI: 1.71; $\epsilon$ (290 nm, $CH_2Cl_2$): 27124;

Elemental analysis:

|        | % C  | % H  | % N |
|--------|------|------|-----|
| theory | 82.6 | 10.6 | 2.1 |
| found  | 81.2 | 10.5 | 2.1 |

17.2 Application Example

Thin linear low density polyethylene (LLDPE) films are prepared as described in Example 8.3. They are 50 $\mu$m thick and contain 1% of the compound.

EXAMPLE 18

18.1 Preparation of the Star-shaped Product of Formula

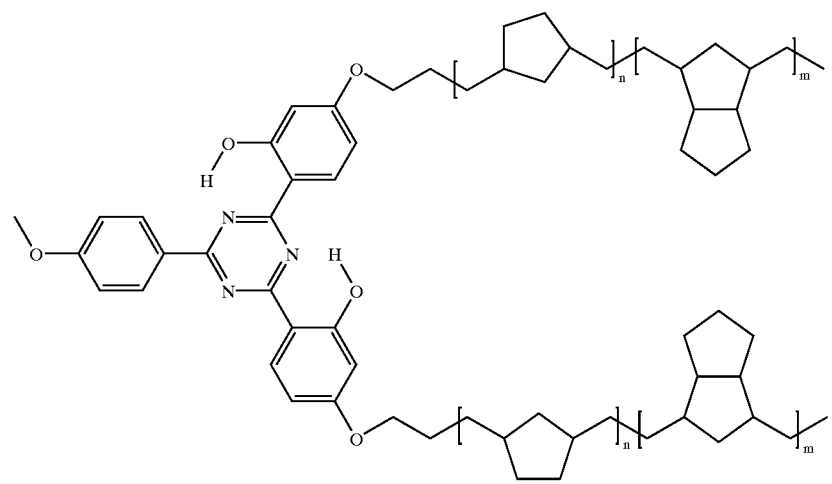

In a manner analogous to Example 11 and using as chain transfer agent the compound reported below:

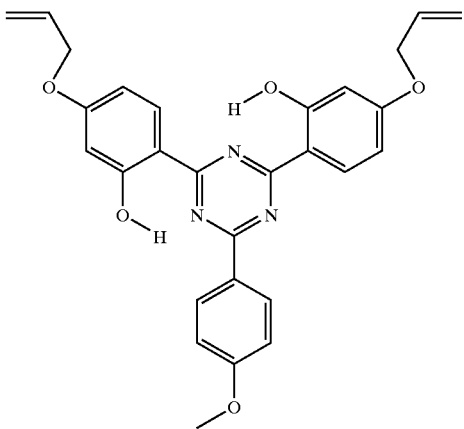

a yellow resinous product is obtained.
Visual melting range: 59–69° C.; $M_n$: 2817; $M_w$: 5039; PDI: 1.79; ε (290 nm, toluene): 31089;
Elemental analysis:

|        | % C  | % H  | % N |
|--------|------|------|-----|
| theory | 83.2 | 10.6 | 2.1 |
| found  | 80.2 | 10.3 | 2.1 |

18.2 Application Example

Thin linear low density polyethylene (LLDPE) films are prepared as described in Example 8.3. They are 50 μm thick and contain 1% of the compound.

EXAMPLE 19

19.1 Preparation of the Hydrogenated Oligomers of the Formula

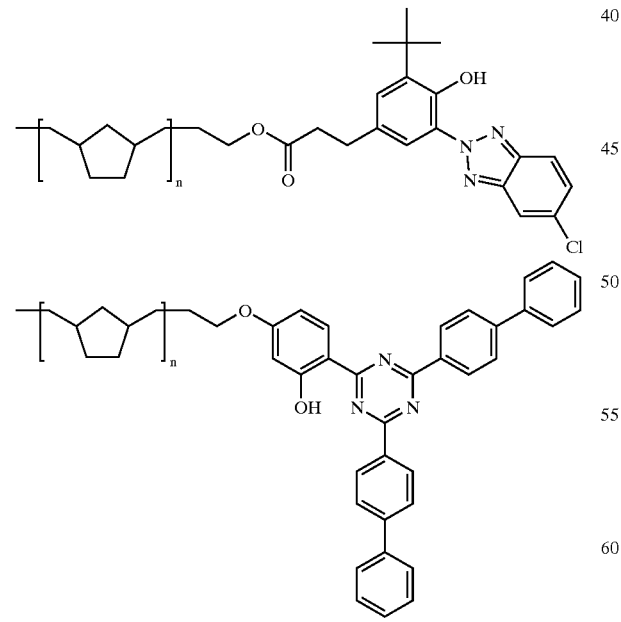

In a manner analogous to Example 1.1 and by using norbornylene as the monomer and as chain transfer agents the compounds from Examples 8.2.2 and 5.2 a yellow powder is obtained.

Visual melting range: 111–116° C.; $M_n$: 2227; $M_w$: 2997; PD): 1.35; ε (290 nm, toluene): 9484;
Elemental analysis:

|        | % C  | % H  | % N | % Cl |
|--------|------|------|-----|------|
| theory | 83.4 | 11.1 | 2.1 | 1.8  |
| found  | 83.4 | 11.1 | 1.9 | 1.4  |

19.2 Application Example

Thin linear low density polyethylene (LLDPE) films are prepared as described in Example 8.3. They are 50 μm thick and contain 1% of the compound. UV-Vis spectra are recorded as described in Example 1.4. The film displays an absorption in the UV region, with transmittance values below 60% between 300 and 380 nm. The compatibility in LLDPE films is determined after storage of the films at room temperature and evaluated as described in Example 8.3. After 500 hours no blooming occurred.

What is claimed is:

1. A compound of the formula:

$$A\!-\!\{[_p\!-\!(X\!-\!Y)_q][B'_{p'}\!-\!(X'\!-\!Y')_{q'}]Z\}_r \qquad (I),$$

wherein
a) one of q and q' represents zero, one or a numeral greater than one and the other one represents one or a numeral greater than one;
A and Z represent chain terminal groups from the chain transfer agent $A(\!-\!Z)_r$;
r represents a numeral from one to four;
B and B' independently of one another represent unsaturated or hydrogenated repeating units from cycloolefins polymerised by metathesis;
X and X' represent identical or different bivalent groups;
Y and Y' represent identical or different UV-light absorber moieties selected from the group consisting of 2-(2'-hydroxyphenyl)benzotriazoles, 2-hydroxybenzophenones, benzoic acid esters, oxanilides and 2-(2-hydroxyphenyl)-1,3,5-triazines; and
one of p and p' represents zero, one or a numeral greater than one and the other one represents one or a numeral greater than one; or wherein
b) q and q' represent zero;
A and Z represent chain terminal groups from the chain transfer agent $A(\!-\!Z)_r$, wherein
A represents the chain terminal group Y"—X"—, wherein
Y" represents a UV-light absorber moiety selected from the group consisting of 2-(2'-hydroxyphenyl)benzotriazoles, 2-hydroxybenzophenones, benzoic acid esters, oxanilides and 2-(2-hydroxyphenyl)-1,3,5-triazines; and
X' represents a bivalent group; and
B, B', p, p' and r are as defined above.

2. A compound (I) according to claim 1, wherein
a) A and Z represent chain terminal groups from a mono- (r=1), di- (r=2) or trifunctional (r=3) chain transfer agent $A(\!-\!Z)_r$;
r represents a numeral from one to three;
B and B' independently of one another represent an unsaturated or hydrogenated repeating unit from cycloolefins polymerised by metathesis selected from the group consisting of cyclopropene, cyclobutene, cyclopentene, cycloheptene, cyclooctene, cyclopentadiene, dicyclopentadiene, cyclohexadiene, cycloheptadiene, cyclooctadiene, norbornadiene, norbornene and norbornene derivatives; and X, X', Y, Y', p, p', q and q' are as defined in claim 1; or wherein b) q and q' represent zero;

A and Z represent chain terminal groups from a mono- (r=1), di- (r=2) r trifunctional (r=3) chain transfer agent A(—Z)r; wherein A represents the chain terminal group Y"—X"—, wherein Y" represents a UV-light absorber moiety; and X" represents a bivalent group; and B, B', p, p' and r are as defined above under a).

3. A compound (I) according to claim 1, wherein

X, X' and X" independently of one another represent bivalent groups selected from the group consisting of —O—, —O—C(=O)—, —C(=O)—O—, —O($C_1$–$C_8$alkylene)- and $C_1$–$C_8$alkylene; and A, B, B', Y, Y', Y", Z, r, p, p', q and q' are as defined in claim 1.

4. A compound (I) according to claim 1, wherein p represents a numeral from 2 to 20;

p represents zero; and

A, B, B', X, X', X", Y, Y', Y", Z, r, q and q' are as defined in claim 1.

5. A compound (I) according to claim 1, wherein a) one of q and q' represents zero, one or a numeral greater than one and the other one represents a numeral greater than one;

A and Z represent chain terminal groups from a mono- (r=1), di- (r=2) or trifunctional (r=3) chain transfer agent A(—Z)$_r$;

r represents a numeral from one to three;

B and B' independently of one another represent an unsaturated or hydrogenated repeating unit from cycloolefins polymerised by metathesis selected from the group consisting of cyclopropene, cyclobutene, cyclopentene, cycloheptene, cyclooctene, cyclopentadiene, dicyclopentadiene, cyclohexadiene, cycloheptadiene, cyclooctadiene, norbornadiene, norbornene and norbornene derivatives;

X and X' independently of one another represent bivalent groups selected from the group consisting of —O—, —O—C(=O)—, —C(=O)—O—, —O($C_1$–$C_8$alkylene)- and $C_1$–$C_8$alkylene;

Y and Y' independently of one another represent a UV-light absorber moiety selected from the group consisting of 2-(2'-hydroxyphenyl)benzotriazoles, 2-hydroxybenzophenones, benzoic acid esters, oxanilides and 2-(2-hydroxyphenyl)-1,3,5-triazines; and p and p' are as defined in claim 1; or wherein b) q and q' represent zero;

A represents the chain terminal group Y"—X"—, wherein

Y" represents a UV-light absorber moiety selected from the group consisting of 2-(2'-hydroxyphenyl) benzotriazoles, 2-hydroxybenzophenones, benzoic acid esters, oxanilides and 2-(2-hydroxyphenyl)-1,3,5-triazines; and X" represents a bivalent group selected from the group consisting of —O—,—O—C(=O)—, —C(=O)—O—, —O($C_1$–$C_8$alkylene)- and $C_1$–$C_8$alkylene; and B, B', p, p' and r are as defined above.

6. A compound (I) according to claim 1, wherein a) one of q and q' represents zero or a numeral greater than one and the other one represents a numeral greater than one;

A and Z represent chain terminal groups from a mono- (r=1), di- (r=2) or trifunctional (r=3) chain transfer agent A(—Z)$_r$;

r represents a numeral from one to three;

B and B' independently of one another represent an unsaturated or hydrogenated repeating unit from cycloolefins polymerised by metathesis selected from the group consisting of cyclopentadiene, dicyclopentadiene, norbornadiene, norbornene and norbornene derivatives;

X and X' independently of one another represent bivalent groups selected from the group consisting of —O—, —O—C(=O)—, —C(=O)—O—, —O($C_1$–$C_8$alkylene)- and $C_1$–$C_8$alkylene;

Y and Y' independently of one another represent a UV-light absorber moiety selected from the group consisting of (2,4-dihydroxyphenyl)-phenylmethanone, 2-benzotriazol-2-yl-4-methylphenol, 4-benzotriazol-2-ylbenzene-1,3-diol, 3-[3-tert-butyl-5-(5-chlorobenzotriazol-2-yl)-4-hydroxyphenyl]-propionic acid, 3-[5-(benzotriazol-2-yl)-3-tert-butyl-4-hydroxyphenyl]-propionic acid, 4-(4,6-diphenyl)-1,3,5-triazin-2-yl-benzene-1,3-diol, 4-[4,6-bis(biphenyl-4-yl)-1,3,5-triazin-2-yl]-benzene-1,3-diol, 4-[4,6-di-(2,4-dihydroxyphenyl)-1,3,5-triazin-2-yl]-benzene-1,3-diol, N'-2-ethylphenyl-N'-2-hydroxyphenyloxalamide; and p and p' are as defined in claim 1; or wherein b) q and q' represent zero;

A represents the chain terminal group Y"—X"—, wherein

Y" represents a UV-light absorber moiety selected from the group consisting of (2,4-dihydroxyphenyl)-phenylmethanone, 2-benzotriazol-2-yl-4-methylphenol, 4-benzotriazol-2-ylbenzene-1,3-diol, 3-[3-tert-butyl-5-(5-chlorobenzotriazol-2-yl)-4-hydroxyphenyl]-propionic acid, 3-[5-(benzotriazol-2-yl)-3-tert-butyl-4-hydroxyphenyl]-propionic acid, 4-(4,6-diphenyl)-1,3,5-triazin-2-yl-benzene-1,3-diol, 4-[4,6-bis(biphenyl-4-yl)-1,3,5-triazin-2-yl]-benzene-1,3-diol, 4-[4,6-di-(2,4-dihydroxyphenyl)-1,3,5-triazin-2-yl]-benzene-1,3-diol, N'-2-ethylphenyl-N'-2-hydroxyphenyloxalamide; and X" represents a bivalent group selected from the group consisting of —O—, —O—C(=O)—, —C(=O)—O—, —O($C_1$–$C_8$alkylene)- and $C_1$–$C_8$alkylene; and B, B', p, p' and r are as defined above.

7. A compound according to claim 1 of the formula

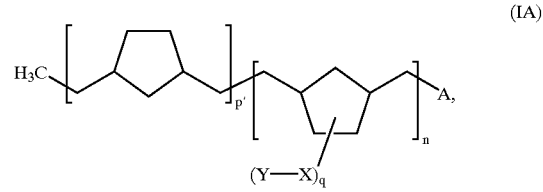

(IA)

wherein q represents one;

p and p' together represent a numeral from 2 to 20;

A represents a chain terminal group from an olefinic chain transfer agent (CTA);

X represents a bivalent group selected from the group consisting of —O—, —O—C(=O)—, —C(=O)—O—, —O($C_1$–$C_8$alkylene)- and $C_1$–$C_8$alkylene; and Y represents a UV-light absorber moiety selected from the group consisting of 2-(2'-hydroxyphenyl)benzotriazoles, 2-hydroxybenzophenones, benzoic acid esters, oxanilides and 2-(2-hydroxyphenyl)-1,3,5-triazines; or wherein q represents zero;

p and p' together represent a numeral from 2 to 20; and

A represents the group Y—X—, wherein
X represents a bivalent group selected from the group consisting of —O—, —O—C(=O)—, —C(=O)—O—, —O($C_1$–$C_8$alkylene)- and $C_1$–$C_8$alkylene; and
Y represents a UV-light absorber moiety selected from the group consisting of 2-(2'-hydroxyphenyl)benzotriazoles, 2-hydroxybenzophenones, benzoic acid esters, oxanilides and 2-(2-hydroxyphenyl)-1,3,5-triazines.

8. A compound according to claim 1 of the formula

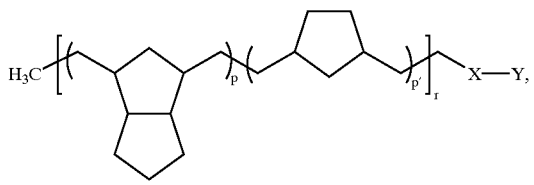

(IB)

wherein
r represents a numeral from one to three;
p and p' together represent a numeral from 2 to 20;
X represents a bivalent group selected from the group consisting of —O—, —O—C(=O)—, —C(=O)—O—, —O($C_1$–$C_8$alkylene)- and $C_1$–$C_8$alkylene; and
Y represents a substituted phenolic group derived from UV-light absorbers selected from the group consisting of (2,4-dihydroxyphenyl)-phenylmethanone, 2-benzotriazol-2-yl-4methylphenol, 4-benzotriazol-2-ylbenzene-1,3-diol, 3-[3-tert-butyl-5-(5-chlorobenzotriazol-2-yl)-4-hydroxyphenyl]-propionic acid, 3-[5-(benzotriazol-2-yl)-3-tert-butyl-4-hydroxyphenyl]-propionic acid; 4-(4,6-diphenyl)1,3,5-triazin-2-yl-benzene-1,3-diol, 4-[4,6-bis(biphenyl-4-yl)-1,3,5-triazin2-yl]-benzene-1,3-diol, 4-[4,6-di-(2,4-dihydroxyphenyl)-1,3,5-triazin2-yl]-benzene-1,3-diol, 4-[4,6-bis(4-hydroxyphenyl)-1,3,5-triazin-2-yl]-benzene-1,3-diol and N'-2-ethylphenyl-N'-2-hydroxyphenyloxalamide.

9. A polymerisate comprising a metathesis polymer of the formula

(I')

wherein
A and A' represent chain terminal groups from a chain transfer agent (CTA);
B represents an unsaturated or hydrogenated repeating unit from cycloolefins polymerised by metathesis;
X represents a bridge group which connects B with the substituent Y;
Y represents the aromatic substituent of a UV-light absorber selected from the group consisting of 2-(2'-hydroxyphenyl)benzotriazoles, 2-hydroxybenzophenones, benzoic acid esters, oxanilides and 2-(2-hydroxyphenyl)-1,3,5-triazines;

p represents a numeral greater than one and defines the number of repeating units in the metathesis polymer; and q represents one or a numeral greater than one and defines the number of aromatic substituents Y attached with the bridge group X to B.

10. A polymerisate according to claim 9 comprising a metathesis polymer (I'), wherein
A and A' represent chain terminal groups from an olefinic chain transfer agent (CTA);
B represents an unsaturated or hydrogenated repeating unit from cycloolefins polymerised by metathesis selected from the group consisting of cyclopropene, cyclobutene, cyclopentene, cycloheptene, cyclooctene, cyclopentadiene, cyclohexadiene, cycloheptadiene, cyclooctadiene, norbornadiene, norbornene and norbornene derivatives;
X represents bivalent atoms or bridge groups selected from the group consisting of —O—, —O—C(=O)— and —C(=O)—O—;
Y represents a substituted phenolic group of UV-light absorbers selected from the group consisting of 2-(2'-hydroxyphenyl)benzotriazoles, 2-hydroxybenzophenones, benzoic acid esters, oxanilides and 2-(2-hydroxyphenyl)-1,3,5-triazines;
p represents a numeral greater than ten; and
q represents one or a numeral greater than one.

11. A polymerisate according to claim 9 comprising a metathesis polymer (I),
wherein
A and A' represent chain terminal groups from an olefinic chain transfer agent (CTA);
B represents an unsaturated or hydrogenated repeating unit from cycloolefins polymerised by metathesis selected from the group the group consisting of cyclopentadiene, norbornadiene, norbornene and norbornene derivatives;
X represents bivalent atoms or bridge groups selected from the group consisting of —O—, —O—C(=O)— and —C(=O)—O—;
Y represents a substituted phenolic group of UV-light absorbers selected from the group consisting of (2,4-dihydroxyphenyl)-phenylmethanone, 2-benzotriazol-2-yl-4-methylphenol, 4-benzotriazol-2-ylbenzene-1,3-diol, 3-[3-tert-butyl-5-(5-chlorobenzotriazol-2-yl)-4-hydroxyphenyl]-propionic acid, 3-[5-(benzotriazol-2-yl)-3-tert-butyl-4-hydroxyphenyl]-propionic acid, 4-(4,6-diphenyl)-1,3,5-triazin-2-yl-benzene-1,3-diol, 4-[4,6-bis(biphenyl-4-yl)-1,3,5-triazin-2-yl]-benzene-1,3-diol, 4-[4,6-di-(2,4-dihydroxyphenyl)-1,3,5-triazin-2-yl]-benzene-1,3-diol, N'-2-ethylphenyl-N'-2-hydroxyphenyloxalamide;
p represents a numeral greater than ten; and
q represents one or a numeral greater than one.

12. A polymerisate according to claim 9 comprising a metathesis polymer (I'),
wherein
A and A' represent chain terminal groups from an olefinic chain transfer agent (CTA);
B represents a polymer fragment comprising repeating units from cycloolefins polymerised by metathesis selected from the group consisting of norbornene-2, 5-methoxycarbonyl-norbornene-2, 5-methyl-5-methoxycarbonyl-norbornene-2, 5-cyanonorbornene-2, 5-methyl-5-cyanonorbornene, 5,5-dicyanonorbornene2,1,4,5,8-dimethano-1,4,4a,5,6,7,8,8a-octahydronapthaline, 6-methyl-1,4,5,8-dimethano-1,4,4a,5,6,7,8,8a-octahydronapthaline, 6-methyl-6-methoxycarbonyl-1,4,5,8-dimethano-1,4,4a,5,6,7,8,8a-octahydronapthaline, 6-methoxycarbonyl-1,4,5,8-dimethano1,4,4a,5,6,7,8,8a-octahydronapthaline, 6-cyano-1,4,5,8-dimethano-1,4,4a,5,6,7,8,8a-octahydronapthaline, 6-ethyl-1,4,5,8-dimethano-1,4,4a,5,6,7,8,8a-octahydronapthaline, 6-ethylidene-1,4,5,8-dimethano-1,4,4a,5,6,7,8,8a-octahydronapthaline, 6,7-dimethyl-1,4,5,8-dimethano-1,4,4a,5,6,7,8,8a-octahydronapthaline, 1,4-dimethano-1,4,4a,9a-tetrahydrofluorene, dicyclopentadiene, tricyclopentadlene, tetracyclopentadiene, tetracyclododecene and methyl tetracyclododecene;

X represents bivalent atoms or bridge groups selected from the group consisting of —O—, —O—C(=O)— and —C(=O)—O—;

Y represents a substituted phenolic group of UV-light absorbers selected from the group consisting of (2,4-dihydroxyphenyl)-phenylmethanone, 2-benzotriazol-2-yl-4methylphenol, 4-benzotriazol-2-ylbenzene-1,3-diol, 3-[3-tert-butyl-5-(5-chlorobenzotriazol-2-yl)-4-hydroxyphenyl]-propionic acid, 3-[5-(benzotriazol-2-yl)-3-tert-butyl-4-hydroxyphenyl]-propionic acid; 4-(4,6-diphenyl)-1,3,5-triazin-2-yl-benzene1,3-diol, 4-[4,6-bis(biphenyl-4-yl]-1,3,5-triazin-2-yl]-benzene-1,3-diol, 4-[4,6-di-(2,4-dihydroxyphenyl)-1,3,5-triazin-2-yl]-benzene-1,3-diol and N'-2-ethylphenyl-N'-2-hydroxyphenyloxalamide;

p represents a numeral greater than ten; and q represents one or a numeral greater than one.

13. A polymerisate according to claim 9 comprising a metathesis polymer having the formula $$A-[\text{cyclopentyl}]_{n'}-[\text{cyclopentyl-CH}_2\text{OY}]_n-A'(X'-Y)_r, \quad (I'')$$

wherein

A and A' represent chain terminal groups from an olefinic chain transfer agent (CTA);

X represents a bridge group which connects A' with Y;

Y represents a substituted phenolic group of UV-light absorbers selected from the group consisting of 2-(2'-hydroxyphenyl)benzotriazoles, 2-hydroxybenzophenones, benzoic acid esters, oxanilides and 2-(2-hydroxyphenyl)-1,3,5-triazines;

r represents zero or one; and n and n' represent numerals greater than zero.

14. A polymerisable composition comprising a) a catalytically effective amount of a penta- or hexavalent ruthenium or osmium carbene catalyst capable of performing ring opening metathesis polymerisation of cycloolefins; and b) the chain transfer agent A(—Z)$_r$ and monomers capable of forming a compound of the formula $$A-\{[B_p(X-Y)_q][B'_{p'}-(X'-Y')_{q'}]Z\}_r, \quad (I),$$

wherein A, B, B',X, X', Y, Y', Z, r, p, p', q and q' are as defined in claim 1.

15. A polymerisable composition according to claim 14 comprising a) a catalytically effective amount of a penta- or hexavalent ruthenium or osmium carbene catalyst of the formulae:

$$\begin{array}{c} L_a \\ \backslash | \\ \text{Me}=\underset{H}{C}-R \quad \text{or} \\ / | \\ L_b L^2 \end{array} \quad \text{(IIa)}$$

$$\begin{array}{c} L_a L^1 \\ \backslash | \\ L_b-\text{Me}=\underset{H}{C}-R, \\ / | \\ L^2 L^3 \end{array} \quad \text{(IIb)}$$

wherein

Me represents ruthenium;

$L_a$ and $L_b$, independently of one another represent anionic ligands;

$L^1$, $L^2$ and $L^3$ independently of one another represent monodentate, neutral e$^-$ donor ligands; and R represents aryl, arylthio or $C_3$–$C_5$-alkenyl; and b) the chain transfer agent A(—Z)$_r$ and monomers capable of forming the compound (I) according to claim 4, wherein A, B, B' X, X', Y, Y', Z, r, p, p', q and q' are as defined in claim 14.

16. A polymerizable composition according to claim 14, wherein the catalytically effective amount of a penta- or hexavalent ruthenium carbene catalyst is selected from the group consisting of

[chemical structures of ruthenium carbene catalysts with P(iPr)$_3$, P(Cy)$_3$, and P(Cypent)$_3$ ligands]

wherein iPr represents isopropyl, Cy represents cyclohexyl and Cypent represents cyclopentyl.

17. A composition comprising

α) a composition of matter susceptible to degradation induced by light, heat or oxidation; and β) the compound (I) according to claim 1, wherein A, B, B' X, X', Y, Y', Z, r, p, p', q and q' are as defined in claim 1.

18. A composition according to claim 17, wherein the composition of matter susceptible to degradation induced by light, heat or oxidation is selected from the group consisting of LDPE, LLDPE, EVA, PP and PET.

19. A method for stabilizing a composition of matter against degradation induced by light, heat or oxidation, which comprises incorporating within the composition of matter a degradation effective amount of a compound (I) according to claim 1, wherein A, B, B' X, X', Y, Y', Z, r, p, p', q and q' are as defined in claim 1.

20. A method according to claim 19 for selectively screening the light radiation to which plants are exposed within green houses, which comprises incorporating within a green house film material an effective amount of a compound (I) according to claim 19.

21. A method according to claim 19 for selectively screening the light radiation to which packed food is exposed, which comprises incorporating within a covering film material an effective amount of a compound (I) according to claim 19.

* * * * *